(12) United States Patent
Graybill et al.

(10) Patent No.: US 11,785,179 B1
(45) Date of Patent: *Oct. 10, 2023

(54) IMAGE AND AUDIO DATA PROCESSING TO CREATE MUTUAL PRESENCE IN A VIDEO CONFERENCE

(71) Applicant: Amazon Technologies, Inc., Seattle, WA (US)

(72) Inventors: Jules C. Graybill, Seattle, WA (US); Katherine M. Ryan, Seattle, WA (US); Maren Marie Costa, Seattle, WA (US); Marshall Friend Tappen, Bainbridge Island, WA (US); Kristina Lisa Klinkner, Vashon, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/884,047

(22) Filed: Aug. 9, 2022

Related U.S. Application Data

(63) Continuation of application No. 17/204,145, filed on Mar. 17, 2021, now Pat. No. 11,451,746.
(Continued)

(51) Int. Cl.
*H04N 7/15* (2006.01)
*G06T 7/11* (2017.01)
(Continued)

(52) U.S. Cl.
CPC .............. *H04N 7/15* (2013.01); *G06T 3/60* (2013.01); *G06T 7/11* (2017.01); *G06T 7/70* (2017.01);
(Continued)

(58) Field of Classification Search
CPC ........ H04N 23/69; H04N 7/147; H04N 23/90; H04N 23/80; H04N 7/15; H04N 2013/0081; G06V 10/25; G06T 7/11; G06T 23/90; G06T 7/70; G06T 2207/20132; G06T 2207/30196
(Continued)

(56) References Cited

U.S. PATENT DOCUMENTS

| | | |
|---|---|---|
| 6,208,373 B1 | 3/2001 | Fong et al. |
| 10,554,928 B2 | 2/2020 | Cutler |

(Continued)

*Primary Examiner* — Melur Ramakrishnaiah
(74) *Attorney, Agent, or Firm* — Athorus, PLLC

(57) ABSTRACT

Systems and methods to improve video conferencing may include various improvements and modifications to image and audio data to simulate mutual presence among users. For example, automated positioning and presentation of image data of users via presentation devices may present users at a position, size, and scale to simulate mutual presence of users within a same physical space. In addition, rendering image data of users from virtual camera positions via presentation devices may simulate mutual eye gaze and mutual presence of users. Further, blending a background, or accentuating a user, within image data that is presented via presentation devices may match visual characteristics of the environment or the user to simulate mutual presence of users. Moreover, dynamic steering of individual audio transducers of an audio transducer array, and simulating audio point sources using a combination of speakers, may simulate direct communication and mutual presence of users.

20 Claims, 13 Drawing Sheets

Related U.S. Application Data

(60) Provisional application No. 63/000,120, filed on Mar. 26, 2020.

(51) Int. Cl.
  *G06V 10/75* (2022.01)
  *G06V 10/25* (2022.01)
  *G06T 7/70* (2017.01)
  *G06V 40/10* (2022.01)
  *G06T 3/60* (2006.01)
  *H04N 23/69* (2023.01)
  *H04N 23/80* (2023.01)
  *H04N 23/90* (2023.01)

(52) U.S. Cl.
  CPC ............ *G06V 10/25* (2022.01); *G06V 10/751* (2022.01); *G06V 40/10* (2022.01); *H04N 23/69* (2023.01); *H04N 23/80* (2023.01); *H04N 23/90* (2023.01); *G06T 2207/20132* (2013.01); *G06T 2207/30196* (2013.01)

(58) Field of Classification Search
  USPC .......................................... 348/14.01–14.16
  See application file for complete search history.

(56) References Cited

U.S. PATENT DOCUMENTS

| | | |
|---|---|---|
| 2012/0169838 A1 | 7/2012 | Sekine |
| 2012/0189168 A1 | 7/2012 | El-Maleh et al. |
| 2014/0028794 A1* | 1/2014 | Wu ................ H04N 13/30 348/43 |
| 2014/0267584 A1 | 9/2014 | Atzpadin et al. |
| 2014/0362170 A1 | 12/2014 | Walker |
| 2017/0142371 A1* | 5/2017 | Barzuza ............ H04L 65/403 |
| 2018/0098026 A1 | 4/2018 | Gadnir et al. |
| 2021/0104063 A1 | 4/2021 | Kassis et al. |
| 2021/0274129 A1 | 9/2021 | Haaland et al. |

* cited by examiner

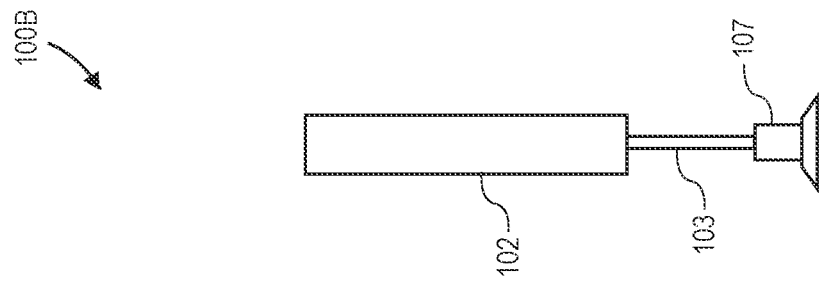
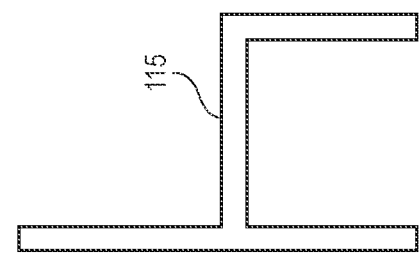
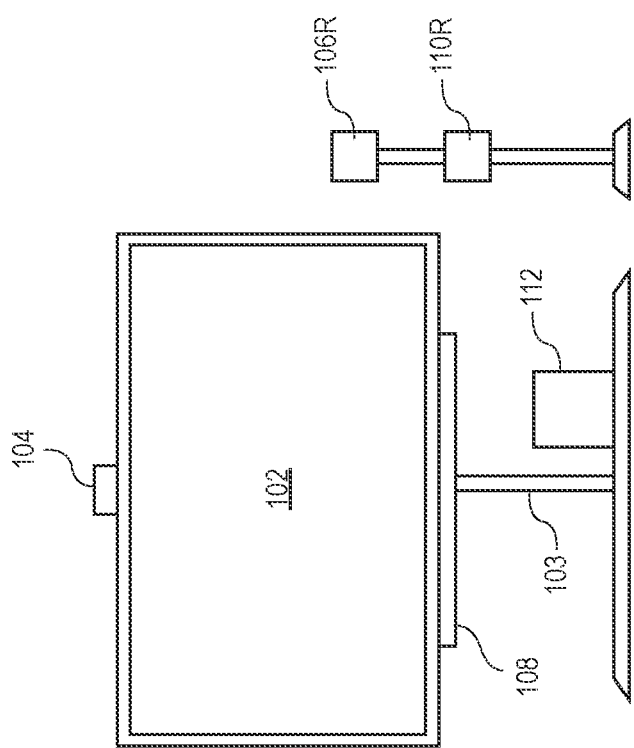
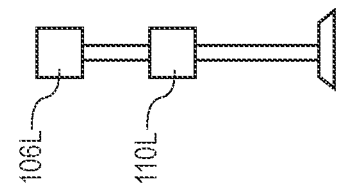

IMAGE AND AUDIO DATA PROCESSING TO CREATE MUTUAL PRESENCE IN A VIDEO CONFERENCE

CROSS-REFERENCE TO RELATED APPLICATIONS

This application claims priority and is a continuation of U.S. application Ser. No. 17/204,145, filed Mar. 17, 2021, and claims priority to U.S. Application No. 63/000,120, filed Mar. 26, 2020, the contents of each of which are herein incorporated by reference in their entirety.

BACKGROUND

Various activities or tasks are increasingly being conducted virtually using video conference, telepresence, or other audio/visual technologies. However, due to myriad factors related to presentation or output of audio and/or video data using such technologies, it may be difficult to ensure that such activities or tasks that are conducted virtually are performed or completed with desired focus, engagement, and/or efficiency. Accordingly, there is a need for systems and methods to improve video conference, telepresence, or other audio/visual technologies to encourage focused, engaged, and/or effective interactions between participants of such activities or tasks.

BRIEF DESCRIPTION OF THE DRAWINGS

FIG. 1A is a schematic, front view diagram of a portion of an example video conference system, in accordance with implementations of the present disclosure.

FIG. 1B is a schematic, side view diagram of a portion of an example video conference system, in accordance with implementations of the present disclosure.

DETAILED DESCRIPTION

Figure 2:
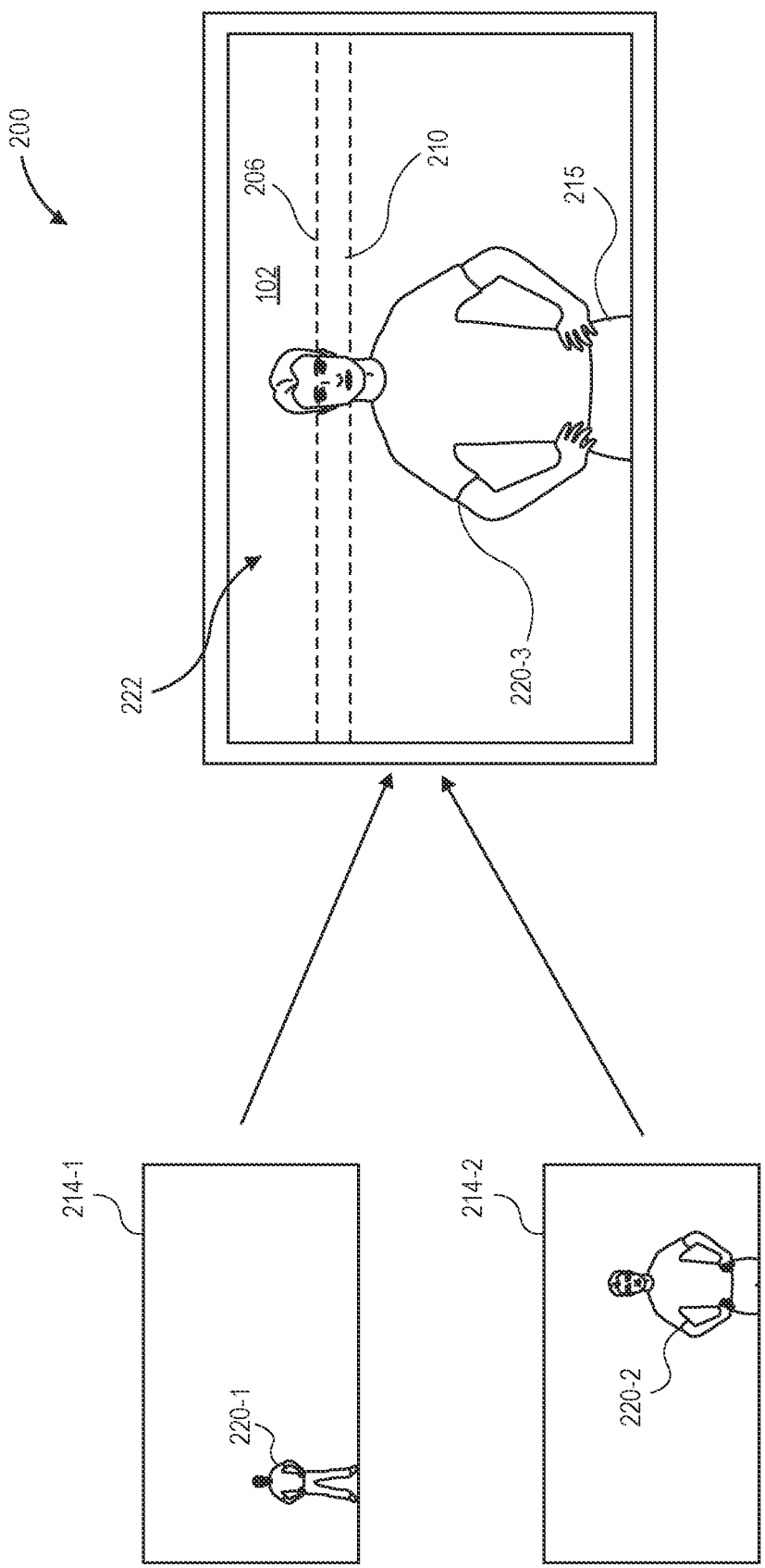
FIG. 2 is a schematic diagram illustrating automated positioning of user image data via a portion of an example video conference system, in accordance with implementations of the present disclosure.

As is set forth in greater detail below, implementations of the present disclosure are directed to systems and methods to improve video conference, telepresence, or other audio/visual technologies to encourage focused, engaged, and/or effective interactions between participants or users of such technologies.

For example, the systems and methods to improve video conference, telepresence, or other audio/visual technologies may comprise a presentation device configured to present visual, video, or image data of a user within a remote environment. In addition, the systems and methods may comprise a first wide angle, high resolution imaging device positioned above the presentation device and configured to capture image data of the local environment and/or a user within the local environment, second and third forward facing imaging devices positioned on either side of the presentation device and configured to capture image data of the local environment and/or the user within the local environment, and a fourth rearward facing imaging device positioned behind the presentation device and configured to capture image data of the local environment behind or around a periphery of the presentation device. In addition, the systems and methods may comprise an audio transducer array positioned above or below the presentation device and configured to capture audio signals of the local environment and/or the user within the local environment, and a combination of static audio output devices, such as first and second speakers positioned on either side of the presentation device and a subwoofer positioned below the presentation device, the combination of static audio output devices configured to emit audio signals to the local environment and/or the user within the local environment.

In example embodiments, image data of a user within a remote environment may be positioned and presented in consistent and desired positions or regions of a presentation device within a local environment. For example, image data of the user within the remote environment may be captured and processed to determine one or more body parts. Then, based on associations between regions of the presentation device within the local environment and the determined body parts of the user, the image data of the user may be modified in various manners, e.g., by cropping, zooming, translating, and/or rotating, to position and present the image data of the user in a consistent and desired manner. In some examples, eyes of the user may be positioned at desired positions, a mouth of the user may be positioned at a desired position, and/or a waist of the user may be positioned at a desired position. Further, the user may be presented via the presentation device at approximately 85% of actual size. In this manner, by modifying, positioning, and presenting image data of the user within the remote environment, via the presentation device within the local environment, interactions between participants using video conference, telepresence, or other audio/visual technologies may be conducted with improved focus, engagement, and/or efficiency.

In some example embodiments, image data of a user within a remote environment may be modified to present the image data of the user from a virtual camera position, e.g., a camera position substantially aligned with a direction of gaze of the user within the remote environment. For example, a gaze of the user within remote environment may be directed to a desired position by positioning and presenting image data on a presentation device within the remote environment at the desired position, e.g., by positioning eyes of a user on the presentation device within the remote environment at the desired position. Then, image data of the user within the remote environment may be captured by a wide angle, high resolution imaging device, as well as two imaging devices positioned on either side of the presentation device, e.g., a left imaging device and a right imaging device. The image data captured by the left and right imaging devices may be processed to identify matching pixels, determine disparities between the matching pixels, determine distances between the matching pixels and each of the left and right imaging devices, and determine three-dimensional locations of the matching pixels relative to the left and right imaging devices. Based on the determined disparities, distances, and/or three-dimensional locations, the matching pixels may be shifted to a view associated with a virtual camera position between the left and right imaging devices. Further, the image data of the user within the remote environment may be presented, via a presentation device within a local environment, with the shifted, matching pixels incorporated or combined with the image data from the high resolution imaging device. In this manner, by modifying and presenting image data of the user within the remote environment from a virtual camera position that is substantially aligned with a direction of gaze of the user within the remote environment, via the presentation device within the local environment, interactions between participants using video conference, telepresence, or other audio/visual technologies may be conducted with improved focus, engagement, and/or efficiency.

In additional example embodiments, image data of a remote environment and/or a user within the remote environment may be modified to blend a background within the image data with a background within the local environment, and/or to accentuate a user within the image data, based on visual characteristics associated with the local environment and/or a user within the local environment. For example, image data of the user within the remote environment may be captured by a wide angle, high resolution imaging device. The image data may be processed to identify the user, as well as to identify the background, within the image data. Then, image data of the local environment, e.g., behind or around a periphery of a presentation device within the local environment, may be captured by a rearward facing imaging device, and processed to determine at least one visual characteristic of the local environment. Based on the determined at least one visual characteristic of the local environment, the image data may be modified to blend the background with the at least one visual characteristic of the local environment, e.g., by modifying color, saturation, contrast, tone, brightness, and/or lighting associated with the background within the image data. Furthermore, image data of the local environment, e.g., of a user within the local environment, may be captured by one or more forward facing imaging devices, and processed to determine at least one visual characteristic of the user within the local environment. Based on the determined at least one visual characteristic of the user within the local environment, the image data may be modified to accentuate the user within the remote environment, e.g., by modifying color, saturation, contrast, tone, brightness, and/or lighting associated with the background within the image data. In this manner, by modifying and presenting image data of the background of the user within the remote environment that is blended with at least one visual characteristic of the local environment, and/or by modifying and presenting image data of the user within the remote environment that is accentuated based on at least one visual characteristic of the user within the local environment, via the presentation device within the local environment, interactions between participants using video conference, telepresence, or other audio/visual technologies may be conducted with improved focus, engagement, and/or efficiency.

In further example embodiments, audio transducers within a remote environment may be dynamically steered to receive audio signals from a user within the remote environment, and audio output devices within the local environment may be configured to simulate an audio point source associated with the user within the remote environment, as presented via a presentation device within the local environment. For example, image data of the user within the remote environment may be captured by a wide angle, high resolution imaging device. The image data may be processed to identify a head of the user, and to determine a position of the head of the user within the remote environment. Based on the determined position, time delays may be selected for individual audio transducers of an audio transducer array, such that the audio transducer array is dynamically steered to receive audio signals from the determined position associated with the head of the user within the remote environment. Furthermore, a combination of static audio output devices may be positioned within the local environment, e.g., left and right audio output devices on either side of the presentation device within the local environment, and a subwoofer below the presentation device. A crossover point for audio signals to be emitted by each of the left and right audio output devices and the subwoofer may be selected. In addition, level differences for each of the left and right audio output devices and the subwoofer may be selected to simulate a phantom center between the combination of static speakers. The phantom center may emulate an audio point source, and the phantom center may be positioned at a desired position of a mouth of the user within the remote environment, as presented via the presentation device within the local environment. Then, the left and right audio output devices may emit substantially directional audio signals to the user within the local environment, and the subwoofer may emit substantially non-directional audio signals to the user within the local environment, based on the selected crossover point and level differences. In this manner, by dynamically steering an audio transducer array based on image data of the user within the remote environment, and/or by simulating, by a combination of static speakers, an audio point source associated with the user within the remote environment, as presented via the presentation device within the local environment, interactions between participants using video conference, telepresence, or other audio/visual technologies may be conducted with improved focus, engagement, and/or efficiency.

Although the description herein presents various example embodiments to facilitate discussion of various concepts and implementations, any of the various example embodiments, or portions thereof, may be used or implemented together with other example embodiments, or portions thereof, in various combinations.

FIG. 1A is a schematic, front view diagram of a portion of an example video conference system 100A, in accordance with implementations of the present disclosure, and FIG. 1B is a schematic, side view diagram of a portion of an example video conference system 100B, in accordance with implementations of the present disclosure.

As shown in FIGS. 1A and 1B, the portion of the example video conference system 100A, 100B may include a presentation device 102 supported by a base or frame 103, and a wide angle, high resolution imaging device 104. The portion of the example video conference system 100A, 100B may also include a left side imaging device 106L, and a left side audio output device 110L, which may also be supported by a base or frame 103. Further, the portion of the example video conference system 100A, 100B may also include a right side imaging device 106R, and a right side audio output device 110R, which may also be supported by a base or frame 103. Moreover, the portion of the example video conference system 100A, 100B may also include an audio transducer array or microphone array 108, and a lower audio output device 112. In addition, the example video conference system 100A, 100B may include or be in communication with computing resources 1300 of an example controller or control system, as described further herein with respect to FIG. 13. Further, as shown in FIG. 1B, the portion of the example video conference system 100A, 100B may further include a rearward facing imaging device 107 and a seat 115 facing a front of the presentation device 102. Each of the portions of the example video conference system 100A, 100B shown in FIGS. 1A and 1B may be substantially identical to each other, and/or include any and all of the features described with respect to each of the portions of the example video conference system 100A, 100B.

The presentation device 102 may comprise any type of monitor, screen, display, television, or other visual output device. As shown in FIG. 1A, the presentation device 102 may be oriented in a landscape mode, e.g., with a longer dimension extending substantially horizontal, or the presentation device 102 may be oriented in a portrait mode, e.g., with a longer dimension extending substantially vertical. The presentation device 102 may be configured to present or display visual, video, or image data that may be received or captured by one or more imaging devices and/or processed in various manners, as described herein. In some example embodiments, the presentation device 102 may be bezel-free or bezel-less, i.e., the presentation device does not include a bezel around an outer periphery, such that visual, video, or image data may be presented by the presentation device 102 up to and including edges associated with the outer periphery of the presentation device 102.

The presentation device 102 may include and be supported by a base or frame 103, which may comprise one or more legs, feet, stands, beams, or other structures to maintain the presentation device 102 in a particular position and orientation. In other example embodiments, the presentation device 102 may be attached or mounted on a wall or other structure, may be suspended by cables, wires, or other elements from a ceiling or other overhead structures, and/or may be held in a particular position and orientation by other structural elements.

The wide angle, high resolution imaging device 104 may comprise any type of imaging device configured to capture high resolution image data of an environment around the example video conference system 100A, e.g., an area in front of and/or facing a front of the presentation device 102. The wide angle, high resolution imaging device 104 may be positioned above, below, on a side of, or around the presentation device. In some embodiments, the wide angle, high resolution imaging device 104 may be coupled to and positioned at a top surface of the presentation device 102. The image data captured by the wide angle, high resolution imaging device 104 may include various portions of the environment, e.g., floor, walls, ceiling, windows, doors, furniture, furnishings, or other elements, as well as one or more users within the environment, e.g., a user who is facing the presentation device 102. As further described herein, image data captured by the wide angle, high resolution imaging device 104 may be modified to present image data of the user with desired visual characteristics on a presentation device of a different or remote portion of the example video conference system 100A, 100B.

The left side imaging device 106L and the right side imaging device 106R may comprise any type of imaging device configured to capture image data of an environment substantially in front of the example video conference system 100A, e.g., an area facing a front of the presentation device 102. The left side imaging device 106L and the right side imaging device 106R may be positioned to the left and right, respectively, of the presentation device, and may be supported by a respective base or frame 103. In some embodiments, the left side imaging device 106L may be coupled to and positioned at a left side surface of the presentation device 102, and the right side imaging device 106R may be coupled to and positioned at a right side surface of the presentation device 102. The image data captured by the left side and right side imaging devices 106L, 106R may include lower resolution image data than that captured by the wide angle, high resolution imaging device 104. The image data captured by the left side imaging device 106L and the right side imaging device 106R may include various portions of the environment, e.g., floor, walls, ceiling, windows, doors, furniture, furnishings, or other elements, and the fields of view of the left side imaging device 106L and the right side imaging device 106R may at least partially overlap. In addition, image data captured by the left side imaging device 106L may include at least partially a left side of a user who is facing the presentation device 102, and image data captured by the right side imaging device 106R may include at least partially a right side of a user who is facing the presentation device 102. As further described herein, image data captured by the left side and right side imaging devices 106L, 106R may be modified to present image data of the user from a virtual camera position between positions of the left side and right side imaging devices 106L, 106R on a presentation device of a different or remote portion of the example video conference system 100A, 100B.

The rearward facing imaging device 107 may comprise any type of imaging device configured to capture image data of an environment substantially behind and/or around a periphery of the example video conference system 100A, e.g., an area behind and/or around a periphery of the presentation device 102. The rearward facing imaging device 107 may be positioned above, below, on a side of, behind, and/or around a periphery of the presentation device 102. The image data captured by the rearward facing imaging device 107 may include lower resolution image data than that captured by the wide angle, high resolution imaging device 104, and/or that captured by the left side and right side imaging devices 106L, 106R. The image data captured by the rearward facing imaging device 107 may include various portions of the environment, e.g., floor, walls, ceiling, windows, doors, furniture, furnishings, or other elements behind and/or around a periphery of the presentation device 102. As further described herein, image data captured by the rearward facing imaging device 107 may be processed to modify image data of a user associated with a different or remote portion of the example video conference system 100A, 100B with desired visual characteristics for presentation on the presentation device 102 of the different or remote portion of the example video conference system 100A, 100B.

The audio transducer array 108 may comprise one or more audio transducers configured to detect and/or emit audio signals. For example, the audio transducer array 108 may be positioned above, below, on a side of, or around the presentation device 102. In some embodiments, the audio transducer array 108 may be coupled to and positioned along a top surface or bottom surface of the presentation device 102, and the audio transducer array 108 may include a plurality of individual audio transducers, e.g., microphones and/or speakers. In one example, the audio transducer array 108 may include ten or more microphones. In addition, the individual audio transducers of the audio transducer array 108 may be evenly spaced, logarithmically spaced, or randomly spaced across the top surface of the presentation device 102. As further described herein, detection and/or emission characteristics of the individual audio transducers of the audio transducer array 108 may be dynamically steered by selection of various time delays to detect audio signals from and/or emit audio signals to a user of the portion of the example video conference system 100A, 100B.

The left side audio output device 110L, the right side audio output device 110R, and the lower audio output device 112 may comprise any type of audio output device or speaker, and may be arranged as a combination of speakers. The left side audio output device 110L and the right side audio output device 110R may be positioned to the left and right, respectively, of the presentation device, and may be supported by a respective base or frame 103. In some embodiments, the left side audio output device 110L may be coupled to and positioned at a left side surface of the presentation device 102, and the right side audio output device 110R may be coupled to and positioned at a right side surface of the presentation device 102. The lower audio output device 112 may be positioned above, below, on a side of, and/or behind the presentation device 102. The left side and right side audio output devices 110L, 110R may be speakers that are configured to output substantially directional audio signals, e.g., relatively higher frequencies of sound, and the lower audio output device 112 may be a subwoofer that is configured to output substantially non-directional audio signals, e.g., relatively lower frequencies of sound. As further described herein, emission characteristics of the individual speakers 110L, 110R, 112 of the combination of speakers may be at least partially steered by selection of various level differences to emit audio signals to a user of the portion of the example video conference system 100A, 100B.

The seat 115 facing a front of the presentation device 102 may comprise any type of seat, chair, stool, couch, or other element upon which a user may sit while using the portion of the example video conference system 100A, 100B. The seat 115 may be positioned at a desired position, orientation, and/or height relative to various portions of the example video conference system 100A, 100B. For example, the seat 115 may face towards and be substantially centered with respect to a front of the presentation device 102. In addition, a waist of a user sitting on the seat 115 may be at a desired height relative to the presentation device 102, e.g., at or near a bottom surface or edge of the presentation device 102. In other example embodiments, a seat 115 may not be provided, and a user may instead stand and face towards and be substantially centered with respect to a front of the presentation device 102, and a desired height relative to various portions of the example video conference system 100A, 100B may be adjusted such that a waist of a user standing in front of the presentation device 102 may be maintained at a desired height relative to the presentation device 102, e.g., at or near a bottom edge or surface of the presentation device 102. In further example embodiments, a user may be positioned at other locations within the area in front of the presentation device 102. As further described herein, the various systems and methods described herein may modify the presentation of image data of the user with desired visual characteristics on a presentation device of a different or remote portion of the example video conference system 100A, 100B regardless of an actual position, orientation, and/or height of the user within the area in front of the presentation device 102 of the portion of the example video conference system 100A, 100B.

Although FIGS. 1A and 1B show a particular number, configuration, and arrangement of various components of a portion of an example video conference system, various other example embodiments may include different numbers, configurations, and arrangements of the various components. For example, other numbers of imaging devices may be included, and/or various imaging devices may be positioned at different locations. In addition, other numbers of audio transducers may be included, and/or various audio transducers may be positioned at different locations. Further, various components of the portion of the example video conference system are not necessarily illustrated to scale.

Moreover, an example video conference system may include two or more portions, with each portion including a presentation device, one or more imaging devices, and one or more audio transducers, that may be in communication with each other, e.g., via Ethernet, the Internet, or other networks, controllers, or control systems that may communicate via various wired and/or wireless connections. In this manner, two or more users may communicate and interact with each other using respective portions of an example video conference system.

In example embodiments described herein, some portions of an example video conference system may be described with respect to a local environment, e.g., a first user utilizing a first presentation device, imaging devices, and audio transducers within a local environment, such that the imaging devices detect the local environment and/or the first user within the local environment, and the audio transducers detect audio signals from and/or emit audio signals into the local environment. In addition, other portions of the example video conference system may be described with respect to a remote environment, e.g., a second user utilizing a second presentation device, imaging devices, and audio transducers within a remote environment, such that the imaging devices detect the remote environment and/or the second user within the remote environment, and the audio transducers detect audio signals from and/or emit audio signals into the remote environment.

In this manner, to facilitate communication and interaction between the first user in the local environment and the second user in the remote environment, image data associated with the second user captured within the remote environment may be presented to the first user via the first presentation device within the local environment, and audio signals detected from the second user within the remote environment may also be output to the first user via the audio transducers within the local environment. Correspondingly, image data associated with the first user captured within the local environment may be presented to the second user via the second presentation device within the remote environment, and audio signals detected from the first user within the local environment may also be output to the second user via the audio transducers within the remote environment.

FIG. 2 is a schematic diagram illustrating automated positioning of user image data via a portion of an example video conference system 200, in accordance with implementations of the present disclosure. The portion of the example video conference system 200 described with reference to FIG. 2 may be substantially identical to, and/or include any and all of the features described with respect to, the portions of the example video conference system 100A, 100B described with reference to FIGS. 1A and 1B.

As described herein, a presentation device 102 within a local environment may generally present image data of a user within a remote environment. However, the presentation device 102 may generally not present any image data of a user within a local environment. For example, a user within a local environment who is viewing the presentation device 102 may generally not be presented with image data of the local environment, i.e., image data that may include the user themselves within the local environment. As a result, a user within a local environment may not have the ability to position themselves in a particular position or orientation relative to a static imaging device, in order to be presented clearly and understandably via a presentation device within a remote environment, and likewise, a user within a remote environment may not have the ability to position themselves in a particular position or orientation relative to a static imaging device, in order to be presented clearly and understandably via a presentation device within a local environment. In order to resolve this, image data of a user within a local environment may be processed, modified, and positioned for presentation in a clear and consistent manner via a presentation device within the remote environment, and image data of a user within the remote environment may also be processed, modified, and positioned for presentation in a clear and consistent manner via the presentation device 102 within the local environment.

As shown in the left side of FIG. 2, a high resolution imaging device may capture image data of the remote environment, and a user within the remote environment. For example, the user may be at various positions or orientations relative to an imaging device, such as a wide angle, high resolution imaging device. In one example of the upper image 214-1 in the left side of FIG. 2, the user 220-1 may be positioned or oriented towards a left side of the image 214-1 and at a relatively greater distance from the high resolution imaging device. In another example of the lower image 214-2 in the left side of FIG. 2, the user 220-2 may be positioned or oriented towards a right side of the image 214-2 and at a relatively lesser distance from the high resolution imaging device.

Using the image data of the user within the remote environment, various body part segmentation algorithms or techniques may be performed on the image data to identify one or more body parts of the user. For example, a head, neck, shoulders, torso, arms, waist, legs, or other body parts of the user may be detected using various types of segmentation algorithms or techniques. In addition, eyes, nose, mouth, ears, or other portions of the head of the user may also be detected using various types of segmentation algorithms or techniques. In some example embodiments, instead of detecting eyes, nose, mouth, ears, or other portions of the head of the user using segmentation, positions of the eyes, nose, mouth, ears, or other portions of the head of the user may be determined or predicted based on detection of the head and assumptions associated with relative positions of portions of the head.

In addition, regions of a presentation device 102 associated with respective body parts may be determined or received. For example, the image data of the user within the remote environment may be intended for presentation on a presentation device 102 within a local environment, and regions of the presentation device 102 within the local environment associated with respective body parts may be determined or received. The regions of the presentation device 102 may be associated with desired positions for a head, neck, shoulders, torso, arms, waist, legs, or other body parts of the user. In addition, the regions of the presentation device 102 may be associated with desired positions for eyes, nose, mouth, ears, or other portions of the head of the user.

Based on the identified body parts of the user within the remote environment and the regions of the presentation device 102 within the local environment associated with respective body parts, the image data of the user may be modified to position respective body parts of the user within respective regions of the presentation device 102. For example, a head of the user may be positioned substantially centered and toward an upper portion of the presentation device 102, a neck and shoulders of the user may be positioned substantially centered and toward a middle portion of the presentation device 102, a torso and arms may be positioned substantially centered and toward a lower portion of the presentation device 102, and/or a waist may be positioned substantially centered and toward a bottom edge of the presentation device 102.

The image data of the user may be modified in various manners, such as cropping, zooming, translating, rotating, or other modifications. For example, the image data of the user may be cropped to remove portions, e.g., portions of the background, portions of lower extremities of the user, and/or extraneous portions of the image data. In addition, the image data of the user may be zoomed to focus on the user or particular body parts of the user, e.g., a head, neck, shoulders, torso, arms, and waist of the user. In some example embodiments, the image data of the user may be zoomed such that the user is presented via the presentation device 102 at approximately 75% of actual size, approximately 85% of actual size, approximately 90% of actual size, approximately 95% of actual size, or approximately 100% of actual size. As described further herein, because various aspects of a background of image data of the user may be blurred, deemphasized, removed, or modified, the presentation of the user at approximately 85% of actual size may prevent disorientation or confusion of the user within the local environment viewing the image data via the presentation device 102 due to the lack or deemphasis of other visual cues within the image data by which the user may determine or ascertain relative size of the user within the remote environment who is presented in the image data.

Further, the image data of the user may be translated to substantially center the user within the presentation device 102, and/or to position and orient the user at a height that substantially matches a height of a user within the local environment viewing the presentation device 102. Moreover, the image data of the user may be rotated to present the user as seated or standing on a horizontal plane parallel with a floor within the local environment, and/or to show the user as facing substantially directly outward from the presentation device 102 toward a user within the local environment. In some example embodiments, the high resolution imaging device may be positioned above the presentation device and capture image data of the remote environment at a downward angle. Thus, the image data of the user within the remote environment may be rotated by rotating a vertical plane associated with the image data, e.g., to remove the downward angle associated with the image data as captured by the high resolution image device within the remote environment. In some examples, the amount of downward angle to be removed from the image data may be determined based on a known orientation, e.g., downward angle, associated with the high resolution imaging device within the remote environment. In other examples, the amount of downward angle to be removed from the image data may be determined based on relative distances between a head, shoulders, or upper portion of the user and feet, legs, or lower portion of the user and the high resolution imaging device, which may be determined using a depth sensor, a time of flight sensor, or other similar sensor that may be associated with the high resolution imaging device.

Based on the modifications to the image data of the user to position respective body parts of the user within respective regions of the presentation device 102, the modified image data 222 including the user 220-3 may be presented via the presentation device 102, as shown in the right side of FIG. 2. As described herein, the image data from the high resolution imaging device may be cropped, zoomed, translated, rotated, or otherwise modified to position the user 220-3 in the remote environment within the modified image data 222 for presentation via the presentation device 102 within the local environment.

Furthermore, eyes of the head of the user may be aligned at a desired position that is substantially centered along a substantially horizontal line between left side and right side imaging devices, such as imaging devices 106L, 106R of FIG. 1A, as indicated by the upper dashed line 206 within the presentation device 102 in the right side of FIG. 2. As described further herein, the automated placement of the eyes of the head of the user at the desired position along the substantially horizontal line between left side and right side imaging devices 106L, 106R may enable or facilitate rendering of a view of the user from a virtual camera position between the left side and right side imaging devices 106L, 106R. In addition, a mouth of the head of the user may be aligned at a desired position that is along a substantially horizontal line between left side and right side audio output devices, such as audio output devices 110L, 110R of FIG. 1A, as indicated by the lower dashed line 210 within the presentation device 102 in the right side of FIG. 2. As described further herein, the automated placement of the mouth of the head of the user at the desired position along the substantially horizontal line between the left side and right side audio output devices 110L, 110R may enable or facilitate simulation of an audio point source between the left side and right side audio output devices 110L, 110R to emit audio signals received from the user. Moreover, a waist 215 of the user may be aligned at a desired position that is along a substantially horizontal plane associated with an expected or determined position of a waist of a user within the local environment who is viewing the presentation device 102, as indicated within the presentation device 102 in the right side of FIG. 2. As described further herein, the automated placement of the waist of the user along a substantially horizontal plane associated with an expected or determined position of a waist of a user within the local environment may facilitate focus and engagement between the two users by simulating mutual presence within a same physical space.

In some example embodiments, the associations between regions of the presentation device 102 within the local environment and respective body parts of a user within a remote environment to be presented may be dynamically determined based on image data of a user within the local environment as well. For example, image data of the user within the local environment who is viewing the presentation device may be captured by one or more imaging devices, and the image data of the user within the local environment may be processed to identify one or more body parts of the user within the local environment. The identification of one or more body parts of the user within the local environment may be performed using various body part segmentation algorithms or techniques as described herein, to identify a head, neck, shoulders, torso, arms, waist, legs, or other body parts of the user, and/or eyes, nose, mouth, ears, or other portions of the head of the user, within the local environment. Further, positions of pixels within the image data associated with respective body parts relative to an optical axis or field of view of an imaging device may be used to determine or approximate positions of respective body parts relative to the imaging device, as described herein. Moreover, positions of respective body parts of the user within the local environment may also be determined relative to the presentation device using other techniques, e.g., using various stereo matching, view interpolation, or other image processing algorithms or techniques described herein.

Then, the dynamic determination of associations between regions of the presentation device with respective body parts of the user within the remote environment may be further based on identified positions of respective body parts of the user within the local environment who is viewing the presentation device. For example, a head of the user within the remote environment to be presented via the presentation device may be associated with a desired position on the presentation device that may correspond with a detected position of a head of the user within the local environment, e.g., a desired position that is translated or moved toward a side or edge of the presentation device closer to a detected position of the head of the user within the local environment. Similarly, a waist of the user within the remote environment to be presented via the presentation device may be associated with a desired position on the presentation device that may correspond with a detected position of a waist of the user within the local environment, e.g., a desired position that is translated or moved toward a side or edge of the presentation device closer to a detected position of the waist of the user within the local environment. Moreover, the dynamic determination of associations between regions of the presentation device with respective body parts of the user within the remote environment based on identified positions of respective body parts of the user within the local environment may correspondingly affect or alter the various modifications to the image data of the user to be presented via the presentation device, e.g., including altering an amount of cropping, a level of zoom, an extent of translation, a degree of rotation, or other amounts, values, levels, or degrees of various other modifications.

In some example embodiments, various of the modifications to the image data of the user may cause misalignment of one or more of the eyes, mouth, waist, or other portions of the user and respective regions of the presentation device. In such examples, the automated placement of the eyes of the head of the user at the desired position along the substantially horizontal line between left side and right side imaging devices 106L, 106R may be prioritized over placement of other portions of the user. In addition, the automated placement of the mouth of the head of the user at the desired position along the substantially horizontal line between the left side and right side audio output devices 110L, 110R may be prioritized second after automated placement of the eyes, and over placement of other portions of the user. Further, the automated placement of the waist of the user along a substantially horizontal plane associated with an expected or determined position of a waist of a user within the local environment may be prioritized third after automated placement of the eyes and mouth, and over placement of other portions of the user. In other example embodiments, various other orders of priority may be determined among the automated placement of various portions of the user within respective regions of the presentation device.

By modifying and automatically positioning image data of a user via a presentation device, as described herein, the image data of the user that is presented via a presentation device may be clear and consistent. For example, a presentation device within a local environment may present image data of a user within a remote environment with identified body parts of the user aligned with desired regions of the presentation device within the local environment. Likewise, a presentation device within a remote environment may present image data of a user within a local environment with identified body parts of the user aligned with desired regions of the presentation device within the remote environment. However, the user within the local environment may actually be located at various positions and orientations within the local environment, and the user within the remote environment may also actually be located at various positions and orientations within the remote environment. In this manner, a user's interaction with the portion of the example video conference system may be substantially asymmetric, e.g., the user within the environment may move relatively freely within the area in front of the portion of the example video conference system, and the user presented via the presentation device may be relatively statically presented in a consistent manner. Thus, a relatively freely moving user within an environment may be relatively statically presented via a presentation device to another user in another environment, thereby facilitating focus and engagement between the users by simulating mutual presence within a same physical space.

Figure 3:
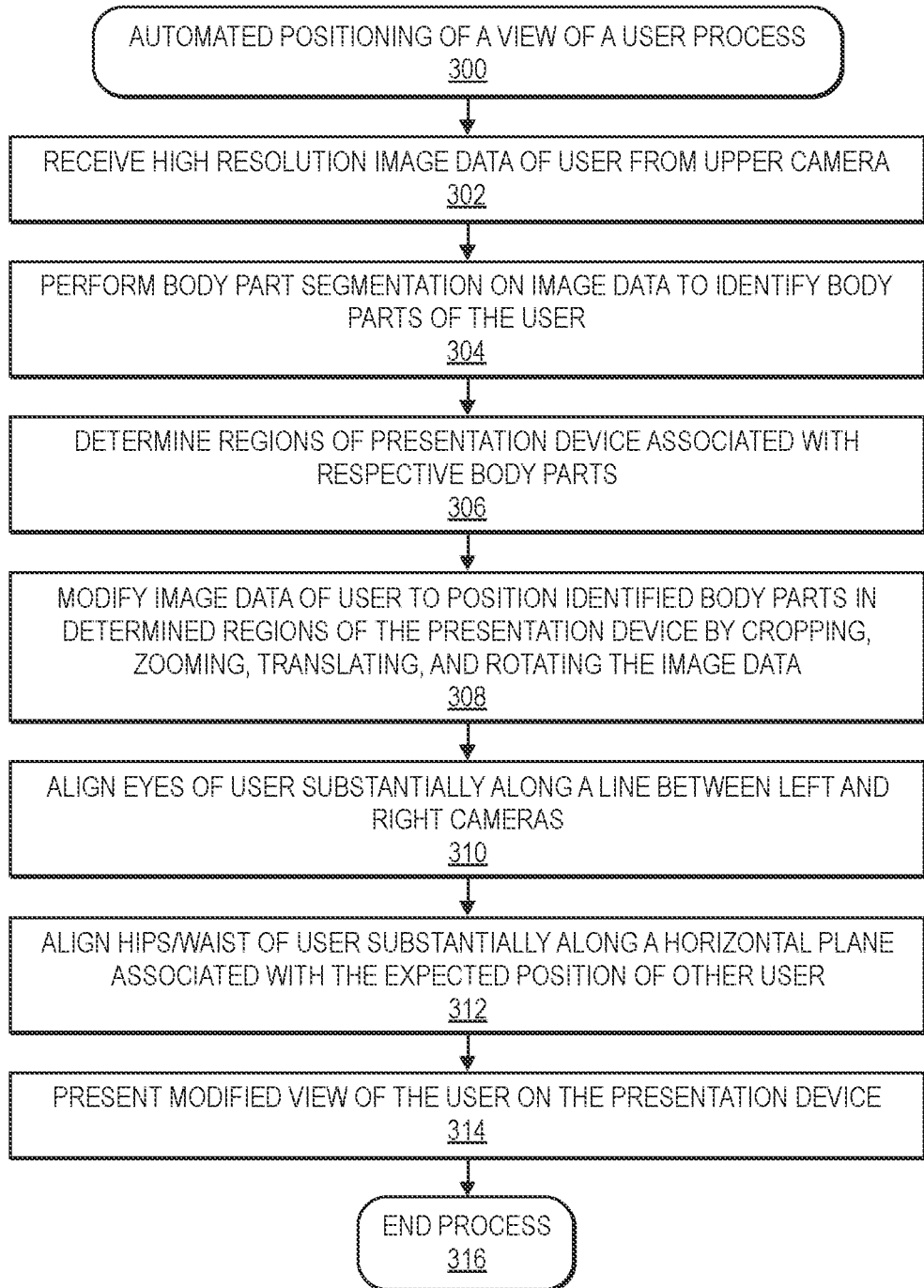
FIG. 3 is a flow diagram illustrating an example automated positioning of a view of a user process, in accordance with implementations of the present disclosure.

FIG. 3 is a flow diagram illustrating an example automated positioning of a view of a user process 300, in accordance with implementations of the present disclosure.

The process 300 may begin by receiving high resolution image data of a user from an upper camera, as at 302. For example, a wide angle, high resolution imaging device may capture image data of an area in front of the portion of the example video conference system, e.g., an area facing the presentation device. The image data may comprise a portion of the environment, and a user within the environment. Further, a controller or control system may receive the image data of the user from the high resolution imaging device.

The process 300 may continue by performing body part segmentation on the image data to identify body parts of the user, as at 304. For example, various segmentation algorithms or techniques may be utilized to process the image data from the wide angle, high resolution imaging device, in order to identify body parts of the user within the image data. The identified body parts of the user may comprise a head, neck, shoulders, torso, arms, waist, legs, or other portions of the user. Further, a controller or control system may process the image data using various segmentation algorithms or techniques in order to identify body parts of the user within the image data.

The process 300 may proceed by determining regions of a presentation device associated with respective body parts, as at 306. For example, various regions of a presentation device via which the image data of the user is to be presented may be determined or received. The various regions of the presentation device may be associated with various body parts, such as a head, neck, shoulders, torso, arms, waist, legs, or other portions of the user. In addition, various regions of the presentation device may be associated with portions of the head of the user, such as eyes, ears, mouth, or other portions of the head of the user. Further, a controller or control system may determine or receive regions of the presentation device associated with respective body parts.

The process 300 may continue to modify image data of the user to position identified body parts in determined regions of the presentation device by cropping, zooming, translating, and rotating the image data, as at 308. For example, the image data may be cropped to remove background or other extraneous portions, the image data may be zoomed to focus on the user, the image data may be translated to center or position the user relative to the presentation device, and/or the image data may be rotated to present the user as facing substantially directly outward from the presentation device and/or as standing or sitting on a horizontal plane substantially coplanar with a floor within the environment. Various other types of modifications may be performed on the image data of the user presented via the presentation device to simulate mutual presence within the same physical space. Further, a controller or control system may modify the image data of the user based on the determined regions of the presentation device.

The process 300 may proceed to align eyes of the user substantially along a line between left and right cameras, as at 310. For example, as part of the modifications of the image data of the user, eyes of the user may be positioned along a substantially horizontal line between left side and right side imaging devices. Such positioning of the eyes of the user presented via the presentation device may facilitate rendering a view of the user within the environment from a virtual camera position between the left side and right side imaging devices, as further described herein. In addition, a mouth of the user may also be positioned along a substantially horizontal line between left side and right side audio output devices. Such positioning of the mouth of the user may facilitate simulating an audio point source for audio signals that are output with the presentation of the user via the presentation device, as further described herein. Further, a controller or control system may modify the image data of the user to align the eyes of the user with the substantially horizontal line between left side and right side imaging devices, and/or to align the mouth of the user with the substantially horizontal line between left side and right side audio output devices.

The process 300 may then continue with aligning the hips/waist of the user substantially along a horizontal plane associated with the expected or determined position of the other user, as at 312. For example, as part of the modifications of the image data of the user, a waist of the user may be positioned along a substantially horizontal plane associated with and coplanar with an expected or determined position of a waist of the user within the environment, e.g., based on an assumption that the user within the environment is seated on a chair in the area in front of the presentation device, based on an assumption that the user within the environment is standing in the area in front of the presentation device, and/or based on a determined position of the waist of the user within image data of the environment. Such positioning of the waist of the user presented via the presentation device may facilitate focus and engagement between users by simulating mutual presence within a same physical space, as further described herein. Further, a controller or control system may modify the image data of the user to align the waist of the user with the substantially horizontal plane associated with the expected or determined position of the waist of the user within the environment.

The process 300 may then proceed with presenting the modified view of the user on the presentation device, as at 314. For example, the image data of the user that has been modified to align identified body parts with determined regions of the presentation device may be presented via the presentation device. In addition, eyes, mouth, and/or waist of the image data of the user may also be aligned with determined regions of the presentation device as described herein. Further, a controller or control system may present the modified image data of the user via the presentation device to facilitate focus and engagement between users by simulating mutual presence within a same physical space.

The process 300 may then end, as at 316.

Figure 4:
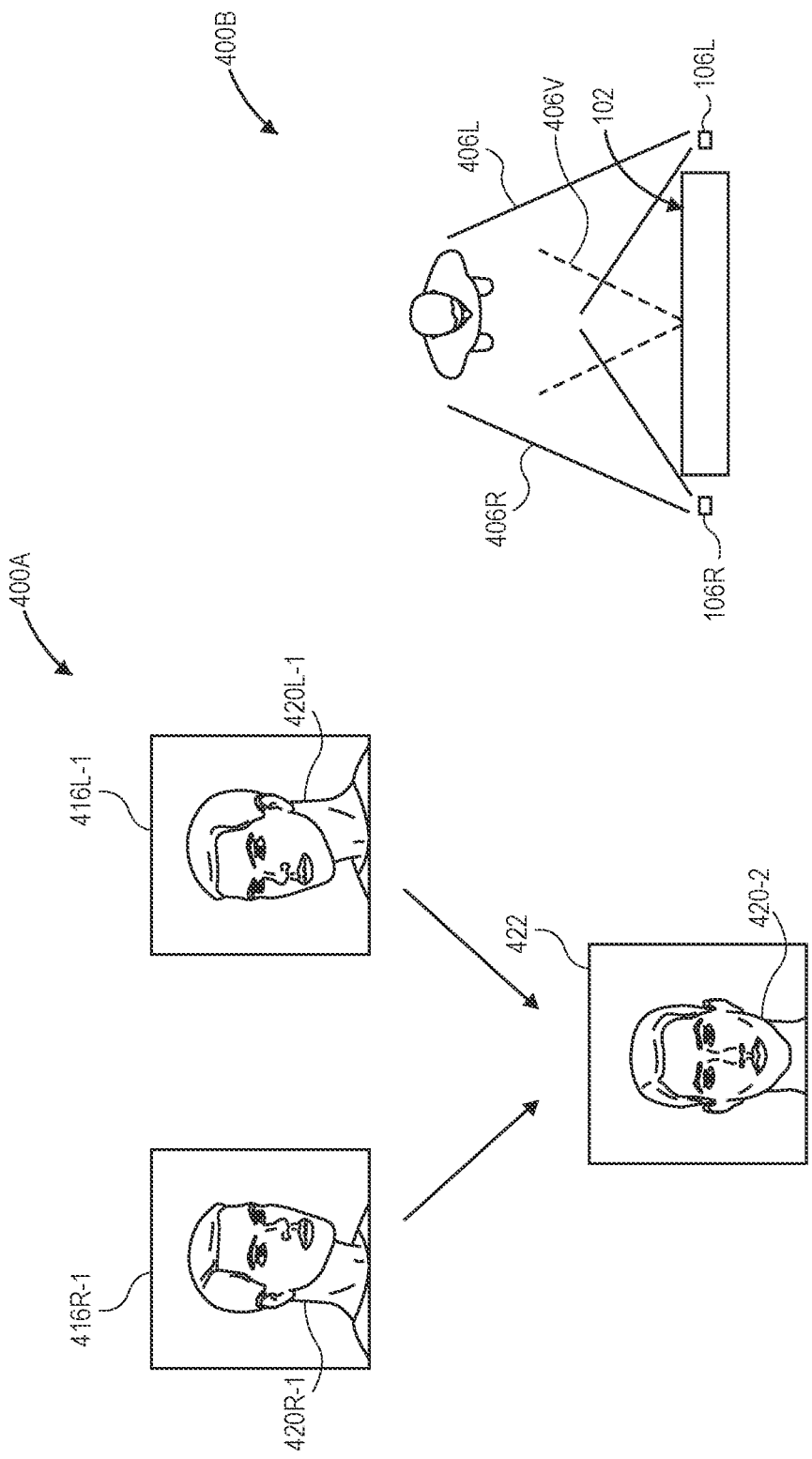
FIG. 4A is a schematic diagram illustrating rendering of user image data from a virtual camera position via a portion of an example video conference system, in accordance with implementations of the present disclosure.
FIG. 4B is a schematic, top view diagram illustrating rendering of user image data from a virtual camera position via a portion of an example video conference system, in accordance with implementations of the present disclosure.

FIG. 4A is a schematic diagram illustrating rendering of user image data from a virtual camera position via a portion of an example video conference system 400A, in accordance with implementations of the present disclosure, and FIG. 4B is a schematic, top view diagram illustrating rendering of user image data from a virtual camera position via a portion of an example video conference system 400B, in accordance with implementations of the present disclosure. The portions of the example video conference system 400A, 400B described with reference to FIGS. 4A and 4B may be substantially identical to, and/or include any and all of the features described with respect to, the portions of the example video conference system 100A, 100B, 200 described with reference to FIGS. 1A, 1B, and 2.

As described herein, a presentation device 102 within a local environment may generally present image data of a user within a remote environment. However, because of the positioning of one or more imaging devices within the remote environment, e.g., around a periphery of a presentation device within the remote environment, the image data of the user may be misaligned relative to a direction of gaze of the user within the remote environment. In addition, positioning an imaging device that is aligned with the direction of gaze of the user within the remote environment may be impractical or infeasible because such an imaging device may then need to be positioned within, or in the middle of, a presentation device within the remote environment. As a result, the image data of the user, e.g., image data of the head, eyes, mouth, or other portions of the head of the user, may be presented via the presentation device 102 within the local environment such that the user appears to be viewing or looking toward a side, bottom, and/or top of the presentation device 102 instead of facing and viewing substantially directly outward from the presentation device 102. In order to resolve this, image data of the user within the remote environment may be processed, modified, and rendered for presentation, via the presentation device within the local environment, from a virtual camera position that is aligned with a direction of gaze of the user within the remote environment, and likewise, image data of a user within the local environment may be processed, modified, and rendered for presentation, via the presentation device within the remote environment, from a virtual camera position that is aligned with a direction of gaze of the user within the local environment.

As shown in the left side of FIG. 4A, a right side imaging device 106R may capture image data 416R-1 of a right side of a user 420R-1 within a remote environment. The right side imaging device 106R may have a field of view 406R, as shown in FIG. 4B, that is oriented or directed toward an expected position of the user within the remote environment, e.g., a user facing a front of the presentation device. Similarly, as shown in the right side of FIG. 4A, a left side imaging device 106L may capture image data 416L-1 of a left side of a user 420L-1 within the remote environment. The left side imaging device 106L may have a field of view 406L, as shown in FIG. 4B, that is also oriented or directed toward an expected position of the user within the remote environment, e.g., a user facing a front of the presentation device. As illustrated, the fields of view 406R, 406L of the right side and left side imaging devices 106R, 106L may at least partially overlap, e.g., at an expected position of the user within the remote environment. In addition, a high resolution imaging device may also capture image data of the remote environment, and the user within the remote environment, and a field of view of the high resolution imaging device may at least partially overlaps the fields of view 406R, 406L of both of the right side and left side imaging devices 106R, 106L.

The image data 416R-1, 416L-1 from the right side and left side imaging devices 106R, 106L may be processed, potentially in combination with image data from the high resolution imaging device, to determine pixels, or subsets or groups of pixels, within the image data 416R-1, 416L-1. The image data 416R-1, 416L-1 may be further processed to determine matching pixels, or matching subsets or groups of pixels, between the image data 416R-1 from the right side imaging device 106R and the image data 416L-1 from the left side imaging device 106L. Various image processing algorithms or techniques may be used to compare pixels, or subsets or groups of pixels, and determine, relative to one or more determined threshold values or ranges, whether pixels, or subsets or groups of pixels, match.

Based on the determination of matching pixels, or matching subsets or groups of pixels, disparities between the matching pixels, or matching subsets or groups of pixels, between the image data 416R-1 from the right side imaging device 106R and the image data 416L-1 from the left side imaging device 106L may be determined. Generally, a disparity between matching pixels, or matching subsets or groups of pixels, may be defined as a distance between a pixel, or subset or group of pixels in one image, e.g., a pixel in the image data 416R-1 from the right side imaging device 106R, and a matching pixel, or subset or group of pixels in another image, e.g., a pixel in the image data 416L-1 from the left side imaging device 106L.

Then, based on known positions and orientations of the right side and left side imaging devices 106R, 106L relative to each other, and based on the determined disparities between the matching pixels, or matching subsets or groups of pixels, distances between the matching pixels, or matching subsets or groups of pixels, and each of the right side and left side imaging devices 106R, 106L may be determined. For example, the known positions and orientations of the right side and left side imaging devices 106R, 106L relative to each other may include a known distance between the right side and left side imaging devices 106R, 106L and/or known angles of respective fields of view of the right side and left side imaging devices 106R, 106L relative to each other. In addition, generally, disparities between the matching pixels, or matching subsets or groups of pixels, and distances between matching pixels, or matching subsets or groups of pixels, and each of the right side and left side imaging devices 106R, 106L may be inversely related. For example, matching pixels having a relatively larger disparity therebetween may be positioned at a relatively shorter distance from each of the right side and left side imaging devices 106R, 106L, and conversely, matching pixels having a relatively shorter disparity therebetween may be positioned at a relatively larger distance from each of the right side and left side imaging devices 106R, 106L.

Furthermore, based on the determined distances between the matching pixels, or matching subsets or groups of pixels, and each of the right side and left side imaging devices 106R, 106L, and based on known positions and orientations of the right side and left side imaging devices 106R, 106L relative to each other, three-dimensional locations of the matching pixels, or matching subsets or groups of pixels, relative to the right side and left side imaging devices 106R, 106L may be determined.

Then, based on the determined three-dimensional locations of the matching pixels, or matching subsets or groups of pixels, relative to the right side and left side imaging devices 106R, 106L, and based on known positions and orientations of the right side and left side imaging devices 106R, 106L relative to each other, matching pixels, or matching subsets or groups of pixels, may be shifted to present the image data 422 of the user 420-2 from a perspective of a virtual camera position having a virtual field of view 406V, as shown in FIGS. 4A and 4B. For example, matching pixels, or matching subsets or groups of pixels, may be shifted so as to appear to be presented from a virtual camera position having a virtual field of view 406V between the right side and left side imaging devices 106R, 106L.

There is no actual imaging device present and positioned at the virtual camera position, and the virtual camera position is selected to be substantially aligned with a direction of gaze of the user within the remote environment. If the right side and left side imaging devices 106R, 106L are positioned symmetrically on either side of the presentation device, and if the user is substantially centered with respect to the presentation device, then the virtual camera position may be an approximate center or midpoint between the positions of the right side and left side imaging devices 106R, 106L. Then, the matching pixels, or matching subsets or groups of pixels, from the image data 416R-1, 416L-1 of the right side and left side imaging devices 106R, 106L may generally be shifted the same amount and in opposite directions in order to appear to present the image data of the user from a virtual camera position that is approximately centered between the positions of the right side and left side imaging devices 106R, 106L.

Various stereo matching and/or view interpolation algorithms or techniques may be utilized to perform various of the determinations and calculations described herein. For example, various stereo matching and/or view interpolation algorithms or techniques may perform processing of pixels, or subsets or groups of pixels, in image data. Various stereo matching and/or view interpolation algorithms or techniques may perform determinations of matching pixels, or subsets or groups of pixels, in image data. Various stereo matching and/or view interpolation algorithms or techniques may perform determinations of disparities between matching pixels, or subsets or groups of pixels, in image data. Various stereo matching and/or view interpolation algorithms or techniques may perform determinations of distances between matching pixels, or subsets or groups of pixels, in image data and respective imaging devices. Various stereo matching and/or view interpolation algorithms or techniques may perform determinations of three-dimensional locations of matching pixels, or subsets or groups of pixels, relative to respective imaging devices. Various stereo matching and/or view interpolation algorithms or techniques may perform shifting of matching pixels, or subsets or groups of pixels, to a virtual field of view associated with a virtual camera position. In some example embodiments, the determinations of three-dimensional locations of matching pixels, or subsets or groups of pixels, may not be necessary or required in order to shift pixels to present a view of the image data from a virtual camera position.

In order to facilitate substantially aligning the virtual camera position with the direction of gaze of the user within the remote environment, the gaze of the user may be directed toward a desired position within the presentation device. The direction of the gaze of the user toward a desired position may effectively result in the capture of substantially rectified image data from each of the right side and left side imaging devices 106R, 106L, which may be considered as pre-rectification, passive rectification, or directed rectification of image data. For example, as described herein, by processing, modifying, and presenting image data of a user via the presentation device for viewing by the user within the remote environment and by positioning a head, eyes, mouth, or other portions of a head of the user at desired positions within the presentation device, the gaze of the user within the remote environment may be directed to the positions of the head, eyes, mouth, or other portions of the head of the user, e.g., may be directed particularly to the eyes of the user. Further, if the right side and left side imaging devices 106R, 106L are positioned symmetrically on a substantially horizontal line on either side of the presentation device, and the positions of the head, eyes, mouth, or other portions of the head of the user are substantially aligned along the substantially horizontal line between the right side and left side imaging devices 106R, 106L, the modification and rendering of the image data of the user from the virtual camera position may be further simplified and accelerated.

In this regard, by substantially aligning the positions of the eyes of the head of the user along the substantially horizontal line between the right side and left side imaging devices 106R, 106L, the determination of matching pixels, or subsets or groups of pixels, between image data 416R-1, 416L-1 from the right side and left side imaging devices 106R, 106L may be simplified and accelerated because it may be assumed that any matching pixels, or subsets or groups of pixels, are positioned along and parallel to the substantially horizontal line between the right side and left side imaging devices 106R, 106L. In addition, the determination of disparities between matching pixels, or subsets or groups of pixels, may also be simplified and accelerated because it may be assumed that the disparities extend parallel to the substantially horizontal line between the right side and left side imaging devices 106R, 106L. Furthermore, the calculation of distances and/or three-dimensional locations of matching pixels, or subsets or groups of pixels, relative to the right side and left side imaging devices 106R, 106L may also be simplified and accelerated based on the simplified geometry between the right side and left side imaging devices 106R, 106L and any matching pixels, or subsets or groups of pixels. Moreover, the shifting or movement of matching pixels, or subsets or groups of pixels, to present a virtual field of view from a virtual camera position may also be simplified and accelerated because it may be assumed that the shifting or movement should extend parallel to the substantially horizontal line between the right side and left side imaging devices 106R, 106L.

By processing, modifying and rendering image data of a user from a virtual camera position via a presentation device, as described herein, the image data of the user that is presented via a presentation device may be substantially aligned with a direction of gaze of the user, such that the user appears to be facing substantially directly outward from the presentation device. For example, a presentation device within a local environment may present image data of a user within a remote environment from a virtual camera position that is substantially aligned with a direction of gaze of the user within the remote environment. Likewise, a presentation device within a remote environment may present image data of a user within a local environment from a virtual camera position that is substantially aligned with a direction of gaze of the user within the local environment. In this manner, respective directions of gaze of the users in each of the local environment and the remote environment may be presented so as to appear to align with each other, because the gaze of each user is directed toward the eyes of the user presented via the presentation device in order to render image data from respective virtual camera positions, and because each user is presented via a presentation device from respective virtual camera positions as facing substantially directly outward from the presentation device. Thus, each user within an environment may perceive that eye contact is substantially maintained with the other user presented via a presentation device, thereby facilitating focus and engagement between the users by simulating mutual gaze and mutual presence within a same physical space.

Figure 5:
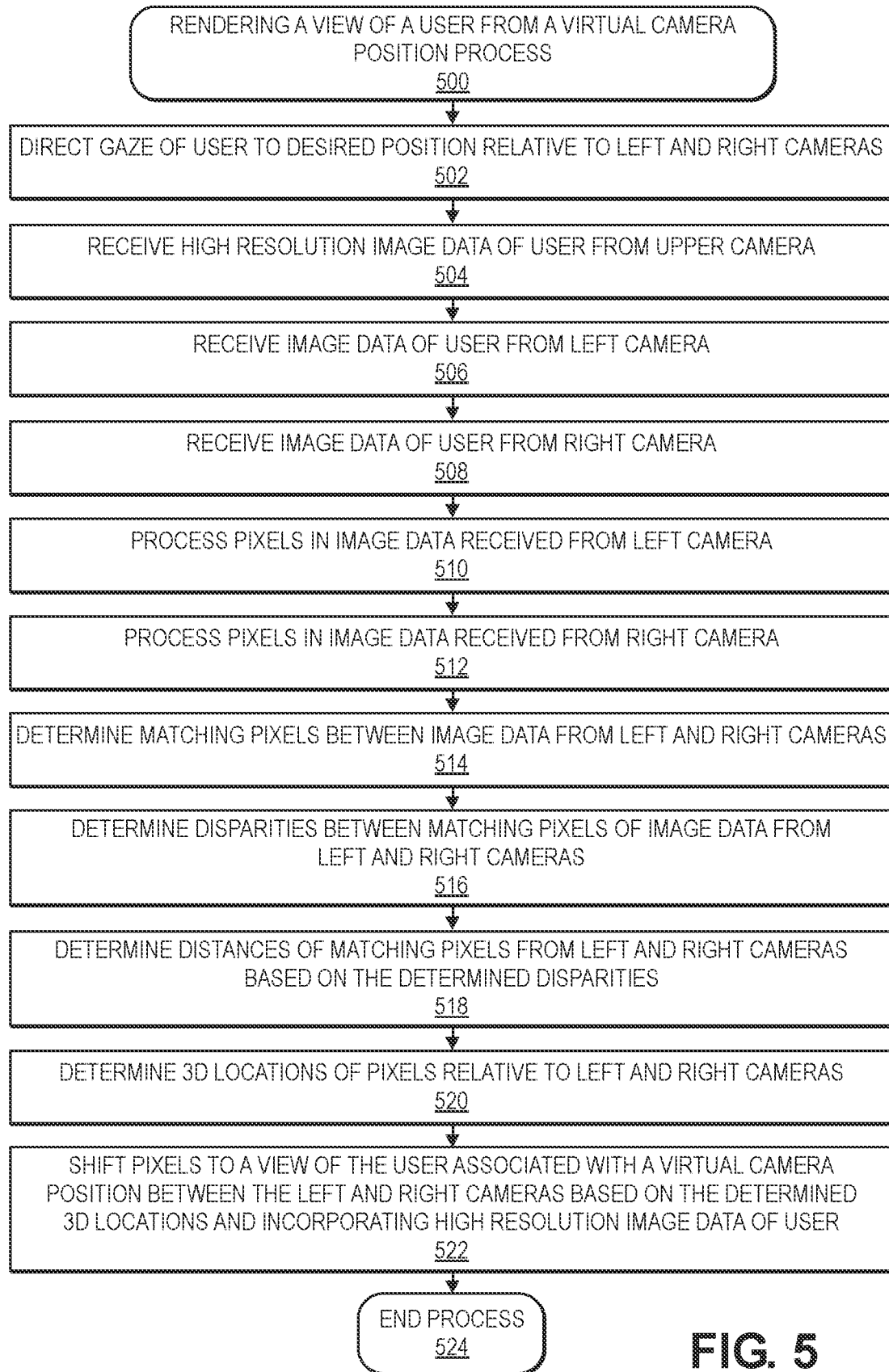
FIG. 5 is a flow diagram illustrating an example rendering a view of a user from a virtual camera position process, in accordance with implementations of the present disclosure.

FIG. 5 is a flow diagram illustrating an example rendering a view of a user from a virtual camera position process 500, in accordance with implementations of the present disclosure.

The process 500 may begin by directing a gaze of a user to a desired position relative to left and right cameras, as at 502. For example, as described herein, by modifying and positioning image data of a user in desired regions of a presentation device, and by positioning the right side and left side imaging devices relative to the desired regions of the presentation device, e.g., relative to desired regions for the head, eyes, mouth, or other portions of the user, a gaze of a user within a remote environment may be directed to a desired position of the presentation device relative to the right side and left side imaging devices. In some examples, a gaze of a user within a remote environment may be directed to eyes of a user presented via the presentation device within the remote environment, and the right side and left side imaging devices may be positioned on either side of the presentation device along a substantially horizontal line that extends through the desired region for presentation of the eyes of the user. Further, a controller or control system may cause presentation of the image data of the user in desired regions of a presentation device to direct a gaze of a user to a desired position relative to right side and left side imaging devices.

The process 500 may continue by receiving high resolution image data of a user from an upper camera, as at 504. For example, a wide angle, high resolution imaging device may capture image data of an area in front of the portion of the example video conference system, e.g., an area facing the presentation device. The image data may comprise a portion of the environment, and a user within the environment. Further, a controller or control system may receive the image data of the user from the high resolution imaging device.

The process 500 may proceed by receiving image data of a user from a left camera, as at 506. For example, an imaging device may capture image data of at least a portion of a left side of a user using a left side imaging device of the portion of the example video conference system, e.g., at least a partial left side of a user facing the presentation device. The image data may comprise a portion of the environment, and a user within the environment. Further, a controller or control system may receive the image data of the user from the left side imaging device.

The process 500 may continue to receive image data of a user from a right camera, as at 508. For example, an imaging device may capture image data of at least a portion of a right side of a user using a right side imaging device of the portion of the example video conference system, e.g., at least a partial right side of a user facing the presentation device. The image data may comprise a portion of the environment, and a user within the environment. Further, a controller or control system may receive the image data of the user from the right side imaging device.

The process 500 may proceed to process the pixels in the image data received from the left camera, as at 510. For example, pixels, or subsets or groups of pixels, within the image data may be processed to determine various characteristics of the image data associated with such pixels, or subsets or groups of pixels. The various characteristics of the image data may comprise colors, lines, edges, surfaces, objects, or other features that are detected within the image data. Various image processing algorithms or techniques may be used to process the image data, such as color, edge, surface, object, feature, other detection, or other types of image processing algorithms or techniques. Further, a controller or control system may process the image data of the user from the left side imaging device to determine one or more visual characteristics associated with pixels, or subsets or groups of pixels.

The process 500 may continue with processing the pixels in the image data received from the right camera, as at 512. For example, pixels, or subsets or groups of pixels, within the image data may be processed to determine various characteristics of the image data associated with such pixels, or subsets or groups of pixels. The various characteristics of the image data may comprise colors, lines, edges, surfaces, objects, or other features that are detected within the image data. Various image processing algorithms or techniques may be used to process the image data, such as color, edge, surface, object, feature, other detection, or other types of image processing algorithms or techniques. Further, a controller or control system may process the image data of the user from the right side imaging device to determine one or more visual characteristics associated with pixels, or subsets or groups of pixels.

The process 500 may then proceed with determining matching pixels between the image data from the left and right cameras, as at 514. For example, pixels, or subsets or groups of pixels, within the image data from the left side and right side imaging devices may be compared to determine, based on one or more threshold values or ranges, whether pixels, or subsets or groups of pixels, within image data from the left side imaging device matches pixels, or subsets or groups of pixels, within image data from the right side imaging device. Various image processing algorithms or techniques may be used to process and compare pixels, or subsets or groups of pixels, within image data, such as color, edge, surface, object, feature, other detection, or other types of image processing algorithms or techniques. Further, a controller or control system may process and compare the image data of the user from each of the left side and right side imaging devices to determine matching pixels, or matching subsets or groups of pixels.

The process 500 may then continue by determining disparities between matching pixels of image data from left and right cameras, as at 516. For example, based on the determined matching pixels, or matching subsets or groups of pixels, disparities between the determined matching pixels, or matching subsets or groups of pixels, from the image data of each of the left side and right side imaging devices may be determined. As described herein, disparities between matching pixels, or matching subsets or groups of pixels, may include a distance between a pixel, or subset or group of pixels in one image, and a matching pixel, or matching subset or group of pixels in another image. Further, a controller or control system may determine disparities between matching pixels, or matching subsets or groups of pixels, within image data of the user from each of the left side and right side imaging devices.

The process 500 may then proceed by determining distances of matching pixels from left and right cameras based on the determined disparities, as at 518. For example, based on the determined disparities, and based on known positions and orientations of the left side and right side imaging devices, distances between matching pixels, or matching subsets or groups of pixels, and each of the left side and right side imaging devices may be determined. As described herein, the determined disparities between matching pixels, or matching subsets or groups of pixels, and the determined distances between matching pixels, or matching subsets or groups of pixels, and each of the left side and right side imaging devices may be inversely related. Further, a controller or control system may determine distances between matching pixels, or matching subsets or groups of pixels, and each of the left side and right side imaging devices.

The process 500 may then continue to determine three-dimensional locations of pixels relative to the left and right cameras, as at 520. For example, based on the determined distances, and based on known positions and orientations of the left side and right side imaging devices, three-dimensional locations of the matching pixels, or matching subsets or groups of pixels, relative to the left side and right side imaging devices may be determined. In this manner, three-dimensional locations of matching pixels, or matching subsets or groups of pixels, within the area within the at least partially overlapping fields of view of the left side and right side imaging devices, e.g., in the area in front of a presentation device relative to which the left side and right side imaging devices are positioned, may be determined. Further, a controller or control system may determine three-dimensional locations of matching pixels, or matching subsets or groups of pixels, relative to each of the left side and right side imaging devices.

The process 500 may then proceed to shift pixels to a view of the user associated with a virtual camera position between the left and right cameras based on the determined three-dimensional locations and incorporating high resolution image data of the user, as at 522. For example, based on the distances and three-dimensional locations of the matching pixels, or matching subsets or groups of pixels, relative to the left side and right side imaging devices, the matching pixels, or matching subsets or groups of pixels, may be shifted or moved to respective positions corresponding to a virtual field of view associated with a virtual camera position that may be between the positions of the left side and right side imaging devices. The virtual camera position may be substantially aligned with a direction of gaze of a user facing the presentation device. Further, a controller or control system may shift or move matching pixels, or matching subsets or groups of pixels, to present a virtual field of view of the user associated with a virtual camera position between the left side and right side imaging devices.

In some example embodiments, the stereo matching and view interpolation processes described herein may primarily focus on particular portions of a user, such as a head, eyes, nose, mouth, or other portions of the head of the user. Then, the shifted or moved pixels associated with the head of the user may be presented in combination with high resolution image data including other portions of the user, e.g., shoulders, torso, arms, waist, etc., as well as portions of the environment, e.g., a background associated with the user. In this manner, the processing, calculation, and computation related to stereo matching and view interpolation may primarily focus on portions of the head of the user, thereby reducing the processing and computation requirements that may be associated with stereo matching and view interpolation processes with respect to other portions of the user and/or portions of the environment, while still facilitating focus and engagement between the users by simulating mutual gaze and mutual presence within a same physical space.

The process 500 may then end, as at 524.

Figure 6:
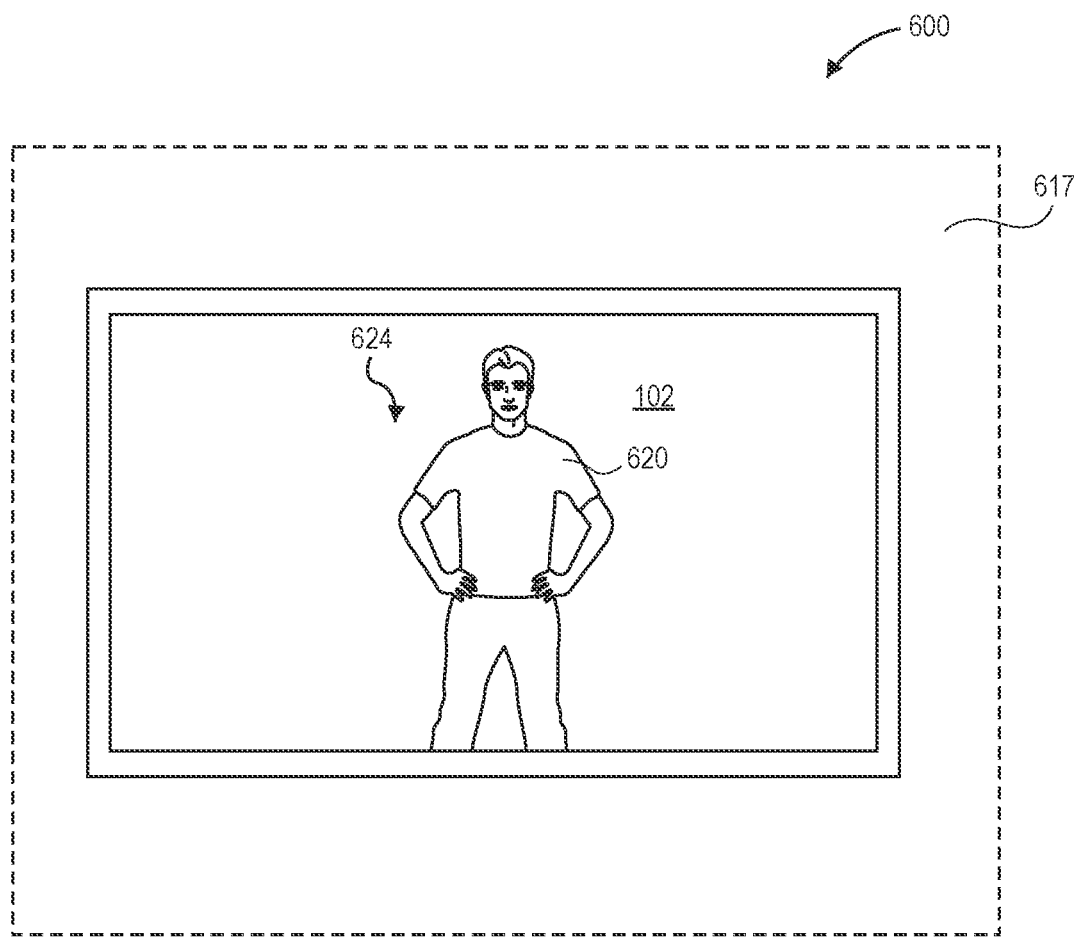
FIG. 6 is a schematic diagram illustrating visual blending of background with a local environment via a portion of an example video conference system, in accordance with implementations of the present disclosure.

FIG. 6 is a schematic diagram illustrating visual blending of background with a local environment via a portion of an example video conference system 600, in accordance with implementations of the present disclosure. The portion of the example video conference system 600 described with reference to FIG. 6 may be substantially identical to, and/or include any and all of the features described with respect to, the portions of the example video conference system 100A, 100B, 200, 400A, 400B described with reference to FIGS. 1A, 1B, 2, 4A, and 4B.

As described herein, a presentation device 102 within a local environment may generally present image data of a user within a remote environment. However, because of differences between aspects of the local environment and aspects of the remote environment, the presentation of image data of the user within the remote environment via the presentation device within the local environment may appear out of place or inconsistent with aspects of the local environment. For example, if the local environment is bright and sunny, but the remote environment is dark and overcast, the presentation of image data associated with one environment via a presentation device within the other environment may appear out of place or inconsistent. Such inconsistencies may distract users during interactions using the example video conference systems described herein, and may detract from simulating mutual presence within a same physical space. In order to resolve this, image data of the user within the remote environment may be processed, modified, and rendered for presentation, via the presentation device within the local environment, by blending at least one visual characteristic of the local environment with a background of the user within the remote environment that is presented via the presentation device, and likewise, image data of the user within the local environment may be processed, modified, and rendered for presentation, via the presentation device within the remote environment, by blending at least one visual characteristic of the remote environment with a background of the user within the local environment that is presented via the presentation device. Further, image data of the user within the remote environment may be processed, modified, and rendered for presentation, via the presentation device within the local environment, by blending at least one visual characteristic of the user within the local environment with a presentation of the user within the remote environment that is presented via the presentation device, and likewise, image data of the user within the local environment may be processed, modified, and rendered for presentation, via the presentation device within the remote environment, by blending at least one visual characteristic of the user within the remote environment with a presentation of the user within the local environment that is presented via the presentation device.

As shown in FIG. 6, image data of a user 620 and a background 624 associated with the user within a remote environment may be presented via a presentation device 102 within a local environment. In addition, the local environment may include an area 617 that is behind and/or around a periphery of the presentation device 102. Image data of the area 617 behind and/or around a periphery of the presentation device 102 may be captured by a rearward facing imaging device 107, as shown in FIG. 1B. Depending on the placement and orientation of the presentation device 102 within a local environment, the image data of the area 617 may include various objects or features associated with the local environment, such as a floor, walls, ceiling, windows, doors, paints, colors, wallpapers, textures, indoor environments, furniture, furnishings, decorations, outdoor environments, sky, clouds, natural objects, roads, sidewalks, or any other objects or features.

In addition, image data of the user within the local environment, as well as portions of the local environment, may also be captured by one or more forward facing imaging devices, such as a high resolution imaging device, a left side imaging device, and/or a right side imaging device. The image data captured by the one or more forward facing imaging devices may primarily focus on the user within the local environment.

In order to blend a background 624 of the image data associated with the remote environment that is presented via the presentation device 102 within a local environment, image data of the remote environment and a user within the remote environment may be captured by a wide angle, high resolution imaging device associated with the remote environment. In addition, the user and a background associated with the user within the image data may be identified using various image processing algorithms or techniques.

The identified background associated with the user within the image data may be modified to adjust one or more visual characteristics, such as color hue, value, saturation, contrast, tone, brightness, lighting, or other visual characteristics. For example, objects or features within the identified background may be blurred, e.g., by reducing the sharpness or focus associated with such objects or features. In addition, color hue, value, saturation, contrast, or tone of portions of the identified background may be modified to deemphasize such portions, e.g., by dulling or muting such portions. Further, brightness or lighting of portions of the identified background may also be modified to deemphasize such portions, e.g., by dimming or darkening such portions.

Furthermore, using a rearward facing imaging device 107 within the local environment, image data of the area 617 behind and/or around a periphery of the presentation device 102 may be captured. Further, the image data captured by the rearward facing imaging device may be processed to determine at least one visual characteristic of the local environment, e.g., the area 617 behind and/or around a periphery of the presentation device 102. The at least one visual characteristic of the local environment may include color hue, value, saturation, contrast, tone, brightness, lighting, or other visual characteristics associated with various portions of the area 617.

Based on the at least one visual characteristic of the local environment determined from the image data captured by the rearward facing imaging device, the background associated with the user presented via the presentation device may be modified or blended based on the determined at least one visual characteristic of the local environment. In some example embodiments, the blending of the background associated with the user based on the determined at least one visual characteristic of the local environment may comprise substantially complete or uniform blending of the background associated with the user. In other example embodiments, the blending of the background associated with the user based on the determined at least one visual characteristic of the local environment may comprise gradual blending of the background associated with the user, e.g., increased or greater blending of the background with increased distance from the user within the image data, such that a portion of the background associated with the user that is closer to the user may more closely match visual characteristics of the remote environment, and a portion of the background associated with the user that is at or near a periphery or edge of the presentation device may more closely match visual characteristics of the local environment. In further example embodiments, the presentation device may not include a bezel or border around an outer periphery thereof, such that the blending of the background associated with the user presented via the presentation device may appear to effectively blend directly into objects or features within the local environment behind and/or around a periphery of the presentation device, thereby facilitating focus and engagement between the users by simulating mutual presence within a same physical space.

In order to accentuate a user 620 in the image data associated with the remote environment that is presented via the presentation device 102 within a local environment, image data of the remote environment and a user within the remote environment may be captured by a wide angle, high resolution imaging device associated with the remote environment. In addition, the user and a background associated with the user within the image data may be identified using various image processing algorithms or techniques.

The identified user within the image data may be modified to adjust one or more visual characteristics, such as color hue, value, saturation, contrast, tone, brightness, lighting, or other visual characteristics. For example, portions or features of the identified user may be clarified, e.g., by increasing the sharpness or focus associated with such portions or features. In addition, color hue, value, saturation, contrast, or tone of portions or features of the identified user may be modified to emphasize such portions, e.g., by modifying or highlighting such portions. Further, brightness or lighting of portions of the identified background may also be modified to emphasize such portions, e.g., by brightening or illuminating such portions.

Furthermore, using at least one forward facing imaging device within the local environment, image data of a user within the local environment, as well as portions of the local environment, may be captured. Further, the image data captured by the forward facing imaging device may be processed to determine at least one visual characteristic of the user within the local environment, e.g., the user facing the presentation device 102 within the local environment. The at least one visual characteristic of the user within the local environment may include color hue, value, saturation, contrast, tone, brightness, lighting, or other visual characteristics associated with various portions or features of the user.

Based on the at least one visual characteristic of the user within the local environment determined from the image data captured by the forward facing imaging device, the presentation of the user via the presentation device may be modified or blended based on the determined at least one visual characteristic of the user within the local environment. In some example embodiments, the modification of the presentation of the user based on the determined at least one visual characteristic of the user within the local environment may comprise substantially matching brightness, time of day, shadows, reflections, lighting direction, color temperature, lighting characteristics, or other visual characteristics associated with the user within the local environment, thereby facilitating focus and engagement between the users by simulating mutual presence within a same physical space.

By processing, modifying or blending, and rendering image data of a user and/or a background associated with the user within a remote environment via a presentation device, as described herein, the image data of the background associated with the user within the remote environment may be deemphasized, and may also be blended with at least one visual characteristic of the local environment behind and/or around a periphery of the presentation device. In addition, the image data of the user within the remote environment may be emphasized, and may also be modified or blended with at least one visual characteristic associated with a user within the local environment. In this manner, image data of a user and/or a background within a remote environment may be modified or blended with visual characteristics of a local environment for presentation via a presentation device within the local environment, and likewise, image data of a user and/or a background within a local environment may be modified or blended with visual characteristics of a remote environment for presentation via a presentation device within the remote environment. Thus, each user within an environment may perceive that the other user and associated background presented via a presentation device may at least partially blend or match with their own environment, thereby facilitating focus and engagement between the users by simulating mutual presence within a same physical space.

Figure 7:
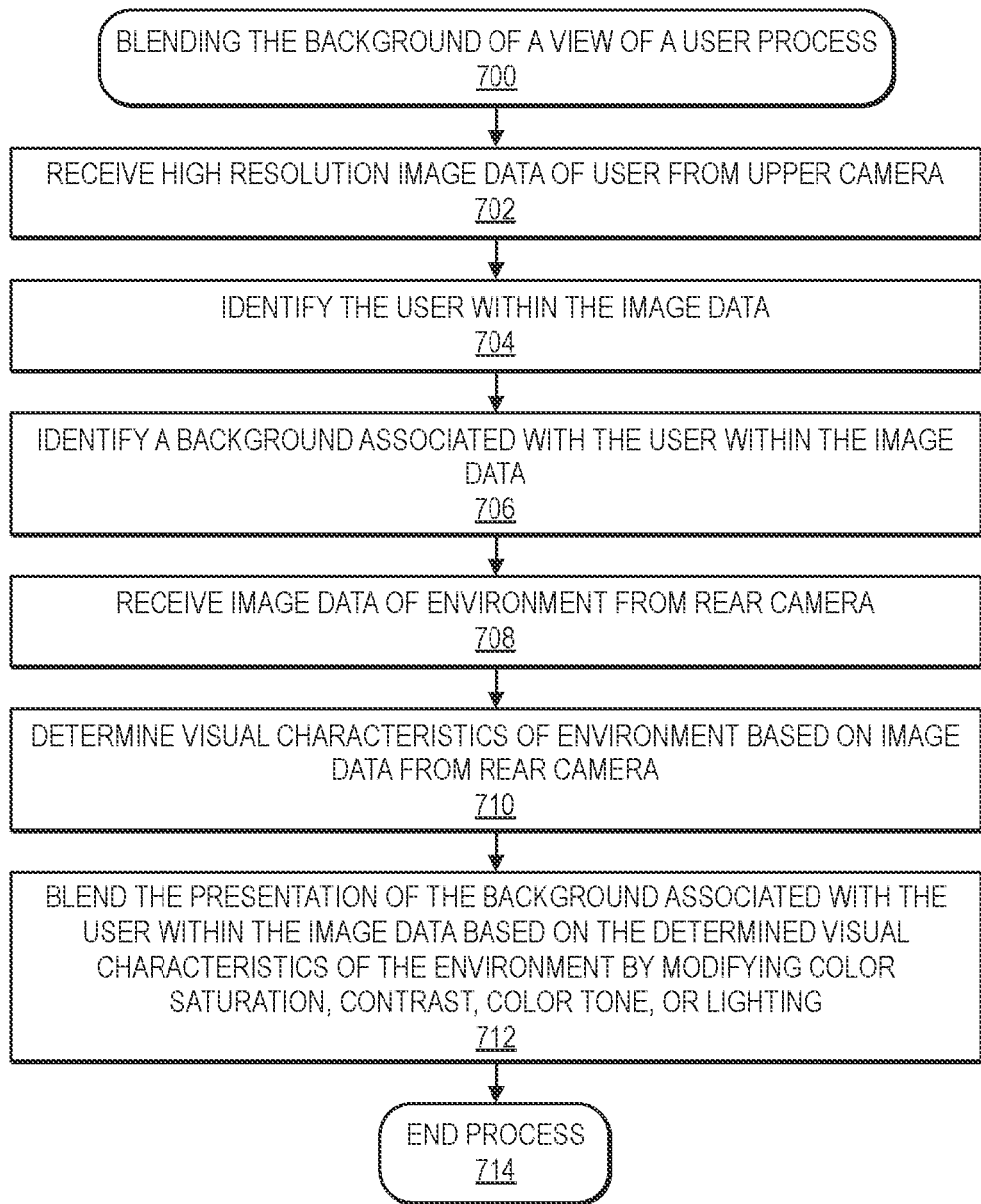
FIG. 7 is a flow diagram illustrating an example blending the background of a view of a user process, in accordance with implementations of the present disclosure.

FIG. 7 is a flow diagram illustrating an example blending the background of a view of a user process 700, in accordance with implementations of the present disclosure.

The process 700 may begin by receiving high resolution image data of a user from an upper camera, as at 702. For example, a wide angle, high resolution imaging device may capture image data of an area within a remote environment in front of a portion of the example video conference system, e.g., an area facing a presentation device. The image data may comprise a portion of the remote environment, a user within the remote environment, and/or a background associated with the user. Further, a controller or control system may receive the image data of the user from the high resolution imaging device.

The process 700 may continue by identifying a user within the image data, as at 704. For example, the image data may be processed to determine portions of a user within the image data. Various image processing algorithms or techniques may be used to process the image data to identify a user, such as color, edge, surface, object, feature, other detection, body part segmentation, or other types of image processing algorithms or techniques. Further, a controller or control system may process the image data from the high resolution imaging device to identify a user within the image data.

The process 700 may proceed by identifying a background associated with the user within the image data, as at 706. For example, the image data may be processed to determine portions of a background associated with the user within the image data. Various image processing algorithms or techniques may be used to process the image data to identify a background, such as color, edge, surface, object, feature, other detection, body part segmentation, or other types of image processing algorithms or techniques. Further, a controller or control system may process the image data from the high resolution imaging device to identify a background associated with the user within the image data.

The process 700 may then continue to receive image data of an environment from a rear camera, as at 708. For example, a rearward facing imaging device may capture image data of an area within a local environment behind and/or around a periphery of a portion of the example video conference system, e.g., an area behind and/or around a periphery of a presentation device. The image data may comprise various objects or features of the local environment that may be behind and/or around a periphery of the presentation device. Further, a controller or control system may receive the image data of the area within the local environment from the rearward facing imaging device.

The process 700 may then proceed to determine visual characteristics of the environment based on the image data from the rear camera, as at 710. For example, the image data may be processed to determine at least one visual characteristic associated with the area within the local environment captured by the rearward facing imaging device. As described herein, the at least one visual characteristic may include color hue, value, saturation, contrast, tone, brightness, lighting, or other visual characteristics associated with portions of the area within the local environment. Further, a controller or control system may process the image data of the area within the local environment from the rearward facing imaging device to determine one or more visual characteristics.

The process 700 may then continue with blending the presentation of the background associated with the user within the image data based on the determined visual characteristics of the environment by modifying color hue, value, saturation, contrast, tone, brightness, or lighting, as at 712. For example, portions of the background associated with the user within the image data may be modified or blended with at least one visual characteristic associated with the area within the local environment as captured by the rearward facing imaging device. In this manner, the background associated with the user within the image data may be completely, partially, and/or gradually modified or blended with one or more visual characteristics of the local environment behind and/or around a periphery of a presentation device, thereby facilitating focus and engagement between the users by simulating mutual presence within a same physical space.

The process 700 may then end, as at 714.

Figure 8:
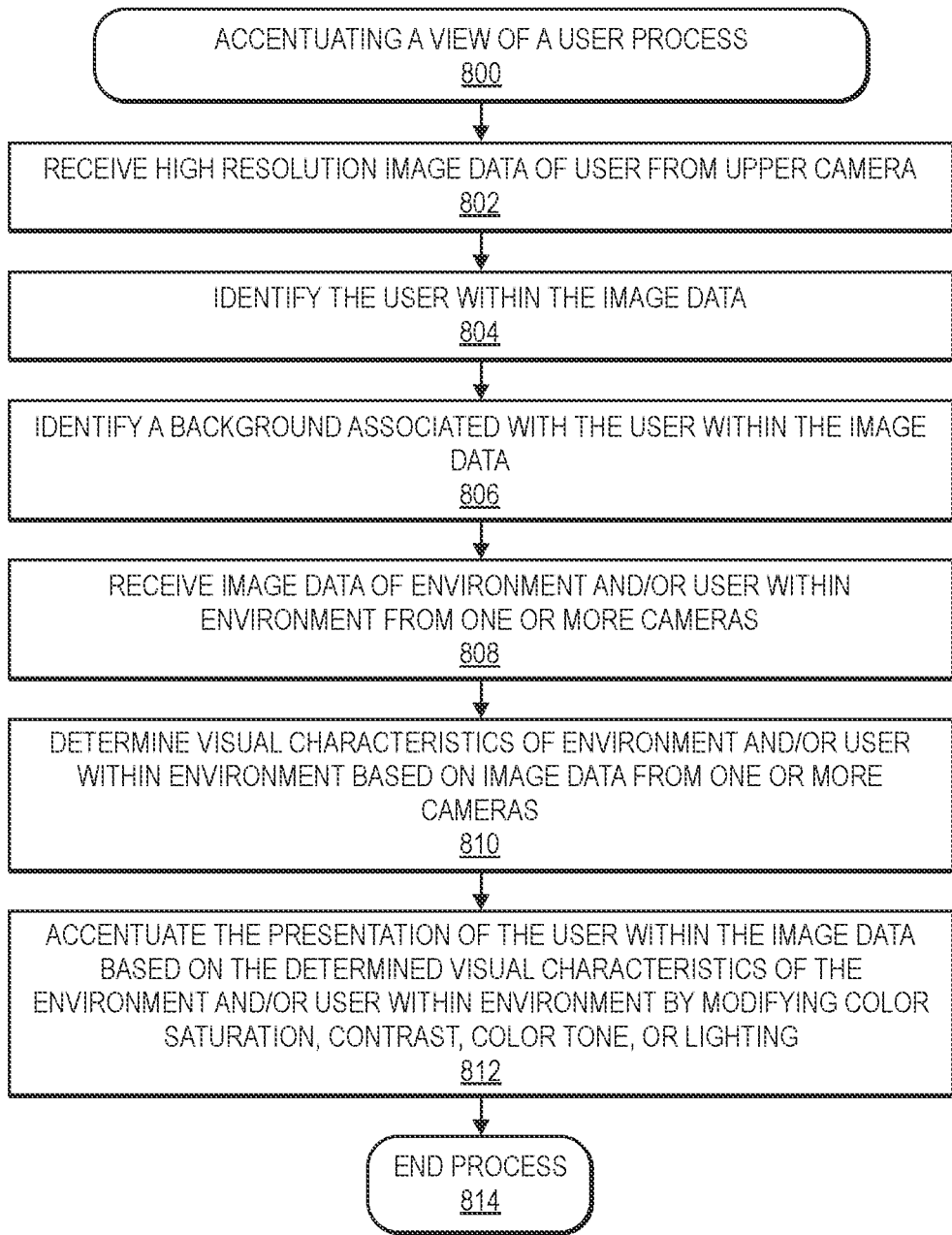
FIG. 8 is a flow diagram illustrating an example accentuating a view of a user process, in accordance with implementations of the present disclosure.

FIG. 8 is a flow diagram illustrating an example accentuating a view of a user process 800, in accordance with implementations of the present disclosure.

The process 800 may begin by receiving high resolution image data of a user from an upper camera, as at 802. For example, a wide angle, high resolution imaging device may capture image data of an area within a remote environment in front of a portion of the example video conference system, e.g., an area facing a presentation device. The image data may comprise a portion of the remote environment, a user within the remote environment, and/or a background associated with the user. Further, a controller or control system may receive the image data of the user from the high resolution imaging device.

The process 800 may continue by identifying a user within the image data, as at 804. For example, the image data may be processed to determine portions of a user within the image data. Various image processing algorithms or techniques may be used to process the image data to identify a user, such as color, edge, surface, object, feature, other detection, body part segmentation, or other types of image processing algorithms or techniques. Further, a controller or control system may process the image data from the high resolution imaging device to identify a user within the image data.

The process 800 may proceed by identifying a background associated with the user within the image data, as at 806. For example, the image data may be processed to determine portions of a background associated with the user within the image data. Various image processing algorithms or techniques may be used to process the image data to identify a background, such as color, edge, surface, object, feature, other detection, body part segmentation, or other types of image processing algorithms or techniques. Further, a controller or control system may process the image data from the high resolution imaging device to identify a background associated with the user within the image data.

The process 800 may then continue to receive image data of an environment and/or a user within the environment from one or more cameras, as at 808. For example, one or more forward facing imaging devices may capture image data of a local environment, particularly a user within the local environment facing a portion of the example video conference system, e.g., an area facing a front of a presentation device. The image data may comprise the user within the local environment, as well as various portions or features within the local environment in front of the presentation device. Further, a controller or control system may receive the image data of the local environment and the user within the local environment from the one or more forward facing imaging devices.

The process 800 may then proceed to determine visual characteristics of the environment and/or the user within the environment based on the image data from the one or more cameras, as at 810. For example, the image data may be processed to determine at least one visual characteristic associated with the user within the local environment captured by the forward facing imaging devices. As described herein, the at least one visual characteristic may include color hue, value, saturation, contrast, tone, brightness, lighting, or other visual characteristics associated with the user within the local environment. Further, a controller or control system may process the image data of the user within the local environment from the forward facing imaging devices to determine one or more visual characteristics.

The process 800 may then continue with accentuating the presentation of the user within the image data based on the determined visual characteristics of the environment and/or the user within the environment by modifying color hue, value, saturation, contrast, tone, brightness, or lighting, as at 812. For example, portions of the user within the image data may be modified or blended with at least one visual characteristic associated with the user within the local environment as captured by the forward facing imaging devices. In this manner, the presentation of the user within the image data may be completely or partially accentuated with one or more visual characteristics of the user within the local environment, such as brightness, time of day, shadows, reflections, lighting direction, color temperature, lighting characteristics, or other visual characteristics associated with the user within the local environment, thereby facilitating focus and engagement between the users by simulating mutual presence within a same physical space.

The process 800 may then end, as at 814.

Figure 9:
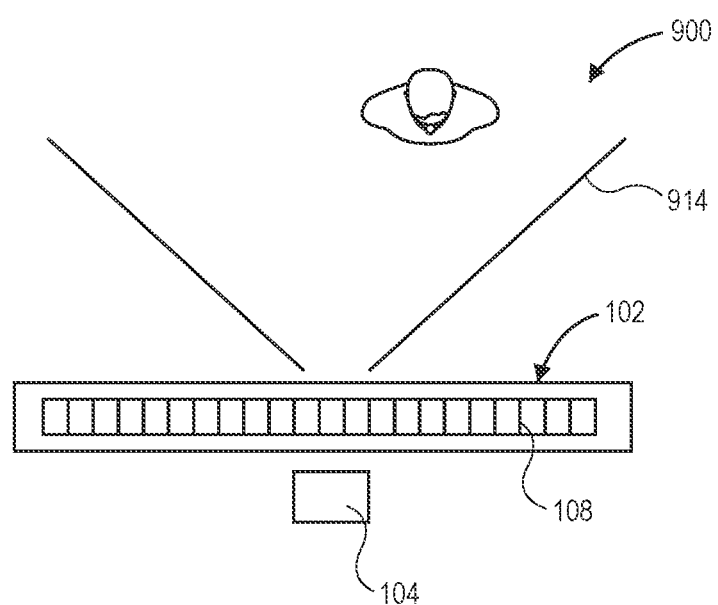
FIG. 9 is a schematic diagram illustrating camera-assisted, dynamic steering of audio transducers via a portion of an example video conference system, in accordance with implementations of the present disclosure.

FIG. 9 is a schematic diagram illustrating camera-assisted, dynamic steering of audio transducers via a portion of an example video conference system 900, in accordance with implementations of the present disclosure. The portion of the example video conference system 900 described with reference to FIG. 9 may be substantially identical to, and/or include any and all of the features described with respect to, the portions of the example video conference system 100A, 100B, 200, 400A, 400B, 600 described with reference to FIGS. 1A, 1B, 2, 4A, 4B, and 6.

As described herein, an audio transducer array 108 within a remote environment may receive audio signals of a user within a remote environment. However, because the user may be located at various positions within an area facing or in front of a presentation device, an audio transducer array 108 may receive other audio signals from other portions of the remote environment, including the user within the remote environment. Such other audio signals may include background noise, echoes, reflections, or other sounds or voices within range of the audio transducer array 108, which may distract users during interactions using the example video conference systems described herein, and may detract from simulating mutual presence within a same physical space. In order to resolve this, an audio transducer array within a remote environment may be dynamically steered to receive audio signals from a location of the user based on image data including the user within the remote environment, and likewise, an audio transducer array within a local environment may be dynamically steered to receive audio signals from a location of the user based on image data including the user within the local environment.

As shown in FIG. 9, a high resolution imaging device 104 may capture image data of the remote environment, and a user within the remote environment. For example, the user may be at various positions or orientations relative to a presentation device 102 and an imaging device, such as a wide angle, high resolution imaging device 104, which may have a field of view 914. As shown in the example of FIG. 9, the user may be positioned or oriented in front of and towards one side of the presentation device 102 and the high resolution imaging device 104.

Using the image data of the user within the remote environment, various body part segmentation algorithms or techniques may be performed on the image data to identify one or more body parts of the user. For example, a head, eyes, nose, mouth, ears, or other portions of the head of the user may be detected using various types of segmentation algorithms or techniques. In some example embodiments, instead of detecting eyes, nose, mouth, ears, or other portions of the head of the user using segmentation, positions of the eyes, nose, mouth, ears, or other portions of the head of the user may be determined or predicted based on detection of the head and assumptions associated with relative positions of portions of the head.

Then, using various image processing algorithms or techniques, a position of the head of the user relative to the presentation device 102, the high resolution imaging device 104, and/or the audio transducer array 108 may be determined based on the identified head or other portions of the head within the image data. In some example embodiments, the position of the head of the user may comprise an angle relative to a vertical plane that extends outward perpendicularly from a center of a plane associated with the presentation device 102 and/or the audio transducer array 108, in which the angle is measured within a substantially horizontal plane. In other example embodiments, the position of the head of the user may comprise a distance, e.g., determined using data from a depth sensor or time of flight sensor, between the head of the user and the presentation device 102, the high resolution imaging device 104, and/or the audio transducer array 108. In further example embodiments, the position of the head of the user may comprise a three-dimensional location of the head of the user within the area in front of the presentation device 102, the high resolution imaging device 104, and/or the audio transducer array 108, which may be based on the determined angle and distance of the head of the user relative to the presentation device 102, the high resolution imaging device 104, and/or the audio transducer array 108.

Based on the determined position of the identified head of the user, one or more time delays for individual audio transducers of the audio transducer array 108 may be selected. The one or more time delays may be selected such that the audio signal detection characteristics of the audio transducer array 108 are dynamically steered toward the determined position of the identified head of the user. Generally, an audio transducer array may be dynamically steered by selection of time delays for individual transducers, and by filtering and/or summing of the detected audio signals to produce a wide band audio signal with a narrow directivity pattern focused on the determined position. Further, the time delays may generally be on the order of milliseconds.

Upon operation of the audio transducer array 108 based on the selected time delays for individual audio transducers, the audio transducer array 108 may detect audio signals that are associated with the determined position of the identified head of the user. Further, the detected audio signals may be additionally processed, e.g., using audio processing algorithms or techniques and/or machine learning algorithms or techniques, to remove ambient sounds or noise and/or to provide additional voice isolation.

By processing and modifying audio detection characteristics for individual audio transducers of an audio transducer array based on a determined position of a head of a user within a remote environment using image data, as described herein, the audio signals detected by the audio transducer array may more accurately capture audio signals from the user within the remote environment, such that the audio signals from the user within the remote environment may then be more accurately output to a user within a local environment who is interacting with the user within the remote environment via a presentation device and audio input/output devices. In this manner, audio signals of a user within a remote environment may be more accurately captured and reproduced to a user within a local environment who is interacting with the user within the remote environment via a presentation device and audio input/output devices, and likewise, audio signals of a user within a local environment may be more accurately captured and reproduced to a user within a remote environment who is interacting with the user within the local environment via a presentation device and audio input/output devices. Thus, each user within an environment may clearly and accurately perceive speech or other audio signals from the other user presented via a presentation device and audio input/output devices, thereby facilitating focus and engagement between the users by simulating mutual presence within a same physical space.

Although the discussion above generally refers to detection of audio signals using the audio transducer array, in other example embodiments, the audio transducer array may be configured to emit audio signals based on time delays selected for individual audio transducers. In similar manner to the discussion above, emission characteristics of individual audio transducers may be dynamically steered by selecting time delays based on a position of an identified head of a user within image data of an environment, such that the emitted audio signals may be more accurately and realistically output to the user within the environment.

Figure 10:
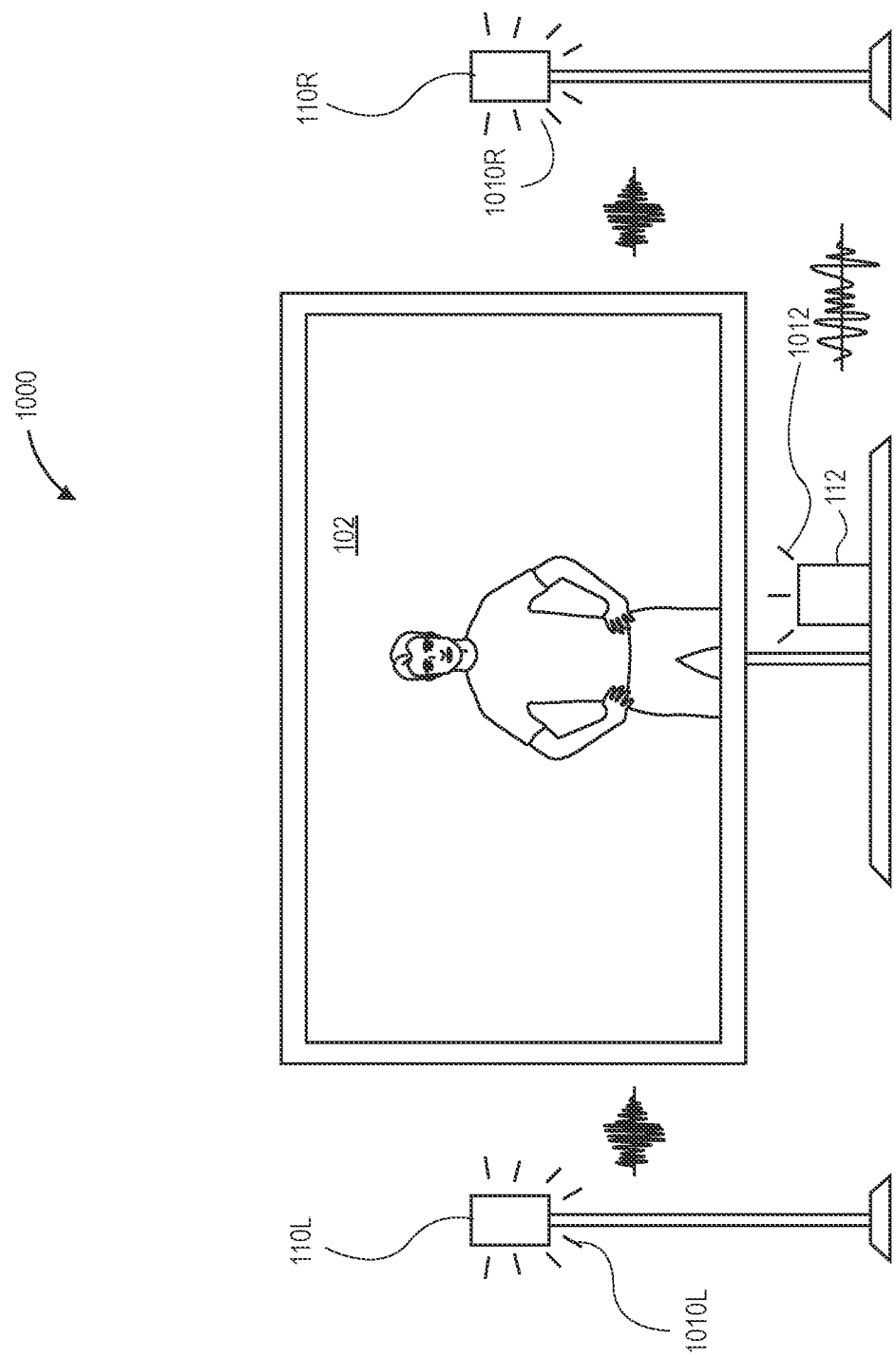
FIG. 10 is a schematic diagram illustrating simulation of an audio point source using static speakers via a portion of an example video conference system, in accordance with implementations of the present disclosure.

FIG. 10 is a schematic diagram illustrating simulation of an audio point source using static speakers via a portion of an example video conference system 1000, in accordance with implementations of the present disclosure. The portion of the example video conference system 1000 described with reference to FIG. 10 may be substantially identical to, and/or include any and all of the features described with respect to, the portions of the example video conference system 100A, 100B, 200, 400A, 400B, 600, 900 described with reference to FIGS. 1A, 1B, 2, 4A, 4B, 6, and 9.

As described herein, a combination of audio output devices within a local environment may emit audio signals received from a user within a remote environment. However, because of the positions and orientations of the combination of audio output devices around a periphery of, on a side of, and/or outside of the presentation device, the emitted audio signals may be perceived as coming from a source other than the user, e.g., a source other than a mouth of the user, as presented via the presentation device, which may distract users during interactions using the example video conference systems described herein, and may detract from simulating mutual presence within a same physical space. In order to resolve this, a combination of audio output devices within a local environment may be configured to emit audio signals to a user within the local environment that simulate an audio point source associated with a mouth of a user within a remote environment as presented via a presentation device, and likewise, a combination of audio output devices within a remote environment may be configured to emit audio signals to a user within the remote environment that simulate an audio point source associated with a mouth of a user within a local environment as presented via a presentation device.

As shown in FIG. 10, the combination of audio output devices may include a right side speaker 110R, a left side speaker 110L, and a lower speaker 112. For example, the right side speaker 110R may be positioned at a right side of the presentation device, and in some embodiments, the right side speaker 110R may be coupled or mounted to a right side or edge of the presentation device 102. The left side speaker 110L may be positioned at a left side of the presentation device, and in some embodiments, the left side speaker 110L may be coupled or mounted to a left side or edge of the presentation device 102. Further, the lower speaker 112 may be positioned below or around the presentation device, and in some embodiments, the lower speaker 112 may be coupled or mounted to a base or frame 103 of the presentation device 102 below and/or behind the presentation device 102. In other example embodiments, the combination or plurality of audio output devices may include various other types, numbers, combinations, and/or arrangements of speakers, speaker bars, woofers, subwoofers, headphones, earbuds, or other audio output devices.

In addition, the left side and right side speakers 110L, 110R may be aligned along a substantially horizontal line that extends across the presentation device 102. Further, as described herein, image data of a user may be positioned and presented via the presentation device 102 such that the mouth of the user is substantially aligned along the substantially horizontal line that extends between the left side and right side speakers 110L, 110R.

The left side and right side speakers 110L, 110R may be configured to output substantially directional audio signals, e.g., relatively higher frequencies of sound, as schematically shown in FIG. 10 as audio signals 1010L, 1010R, and the lower speaker 112 may be a subwoofer that is configured to output substantially non-directional audio signals, e.g., relatively lower frequencies of sound, as schematically shown in FIG. 10 as audio signal 1012.

In order to simulate an audio point source, e.g., a phantom center, associated with a mouth of the user as presented via the presentation device, a crossover point may be selected between audio signals to be emitted by the left side and right side speakers 110L, 110R and audio signals to be emitted by the lower speaker 112. The crossover point may be selected such that substantially directional audio signals may be emitted by the left side and right side speakers 110L, 110R, and such that substantially non-directional audio signals may be emitted by the lower speaker 112. In addition, if the mouth of the user is centered between the left side and right side speakers 110L, 110R, each of the left side speaker 110L and the right side speaker 110R may emit substantially similar audio signals to simulate an audio point source therebetween.

Furthermore, in order to simulate the audio point source, e.g., a phantom center, associated with a mouth of the user as presented via the presentation device, level differences may be selected for each of the left side speaker 110L, the right side speaker 110R, and the lower speaker 112. The level differences may be selected such that audio signals emitted by the combination of speakers generate a phantom center associated with the mouth of the user, in order to simulate origination of the emitted audio signals from the mouth of the user as presented via the presentation device. In addition, if the mouth of the user is centered between the left side and right side speakers 110L, 110R, the level differences between audio signal emission characteristics of each of the left side speaker 110L and the right side speaker 110R may be substantially zero to simulate an audio point source therebetween. Further, the level difference associated with audio signal emission characteristics of the lower speaker 112 may be selected to further simulate an audio point source associated with the mouth of the user together with the left side and right side speakers 110L, 110R. In further example embodiments, depending on a configuration or arrangement of a plurality of audio output devices, time delays may also be selected between one or more audio output devices and others of the audio output devices to further simulate an audio point source among the plurality of audio output devices, potentially in combination with various level differences between audio signal emission characteristics of the plurality of audio output devices.

Furthermore, because the positioning and presentation of the user via the presentation device 102 may be substantially static or fixed, based on the automated positioning of body parts of the user within desired regions of the presentation device, as further described herein, the selection of level differences for the combination of audio output devices may also be substantially static or fixed to simulate an audio point source associated with the mouth of the user. Generally, a combination of audio output devices may be operated based on selection of level differences for individual speakers, such that the individual emitted audio signals may overlap to produce a combined audio signal, and the combined audio signal may generate an associated phantom center to simulate an audio point source.

By processing and modifying audio emission characteristics for individual audio output devices of a combination of audio output devices using level differences to generate a phantom center associated with a mouth of a user presented via a presentation device, as described herein, the audio signals emitted by the combination of audio output devices may simulate an audio point source associated with a mouth of the user presented via the presentation device, even in the absence of any actual audio output device at the position of the mouth of the user. In this manner, audio signals from a user within a remote environment may be output to a user within a local environment such that the audio signals may be perceived as emanating from the mouth of the user presented via the presentation device, and likewise, audio signals from a user within a local environment may be output to a user within a remote environment such that the audio signals may be perceived as emanating from the mouth of the user presented via the presentation device. Thus, each user within an environment may clearly and accurately perceive speech or other audio signals as emanating directly from the other user presented via a presentation device and audio input/output devices, thereby facilitating focus and engagement between the users by simulating mutual presence within a same physical space.

Figure 11:
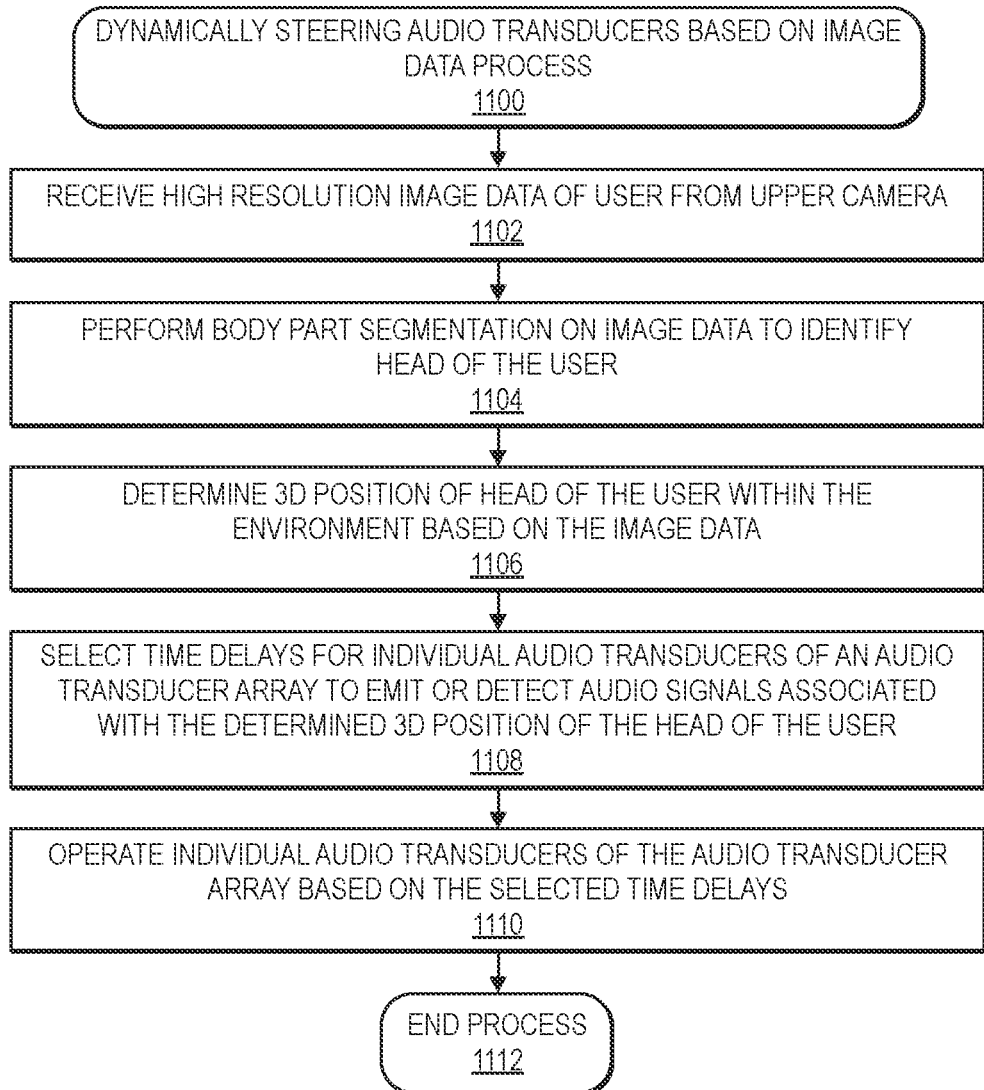
FIG. 11 is a flow diagram illustrating an example dynamically steering audio transducers based on image data process, in accordance with implementations of the present disclosure.

FIG. 11 is a flow diagram illustrating an example dynamically steering audio transducers based on image data process 1100, in accordance with implementations of the present disclosure.

The process 1100 may begin by receiving high resolution image data of a user from an upper camera, as at 1102. For example, a wide angle, high resolution imaging device may capture image data of an area in front of the portion of the example video conference system, e.g., an area facing the presentation device. The image data may comprise a portion of the environment, and a user within the environment. Further, a controller or control system may receive the image data of the user from the high resolution imaging device.

The process 1100 may continue by performing body part segmentation on the image data to identify a head of the user, as at 1104. For example, various segmentation algorithms or techniques may be utilized to process the image data from the wide angle, high resolution imaging device, in order to identify the head of the user within the image data. The identified body parts of the user may also comprise a neck, shoulders, torso, arms, waist, legs, or eyes, nose, mouth, ears, or other portions of the head of the user. Further, a controller or control system may process the image data using various segmentation algorithms or techniques in order to identify the head of the user within the image data.

The process 1100 may proceed by determining a three-dimensional position of the head of the user within the environment based on the image data, as at 1106. For example, based on the position of the identified head of the user within the image data, and based on known positions and orientations of the high resolution imaging device, the presentation device, and/or the audio transducer array, a position of the head of the user may be determined, which may include an angle, a distance, and/or a three-dimensional position of the head of the user relative to the high resolution imaging device, the presentation device, and/or the audio transducer array. Further, a controller or control system may process the image data using various segmentation algorithms or techniques in order to identify the head of the user within the image data.

In example embodiments, the angle of the identified head of the user relative to the high resolution imaging device, the presentation device, and/or the audio transducer array may be determined relative to an optical axis associated with the high resolution imaging device, a line extending perpendicularly from a center of a plane associated with the presentation device, a line extending perpendicularly from a center or midpoint of a plane associated with the audio transducer array, and/or a vertical plane extending perpendicularly from a center or midpoint of a plane associated with the presentation device and/or the audio transducer array. In addition, the angle may be defined within a substantially horizontal plane, such that the angle relates to a left-to-right angular offset relative to the high resolution imaging device, the presentation device, and/or the audio transducer array.

In addition, the distance of the identified head of the user relative to the high resolution imaging device, the presentation device, and/or the audio transducer array may be determined based on data from a depth sensor, a time of flight sensor, or other distance measurement sensor. In other example embodiments, image data may be received from multiple imaging devices, and various stereo matching algorithms or techniques may be performed to determine the distance of the identified head of the user relative to the high resolution imaging device, the presentation device, and/or the audio transducer array.

Further, the three-dimensional position of the identified head of the user relative to the high resolution imaging device, the presentation device, and/or the audio transducer array may be determined based on the angle and the distance of the identified head of the user relative to the high resolution imaging device, the presentation device, and/or the audio transducer array. In this manner, a position of the identified head of the user within a three-dimensional space or area in front of the portion of the example video conference system may be determined.

The process 1100 may continue to select time delays for individual audio transducers of an audio transducer array to emit or detect audio signals associated with the determined three-dimensional position of the head of the user, as at 1108. For example, based on the determined angle, distance, and/or three-dimensional position of the identified head of the user, time delays for individual audio transducers, e.g., microphones or speakers, of the audio transducer array may be selected such that detection or emission characteristics of the audio transducer array may be steered or directed toward the determined position of the head of the user. As described herein, the selected time delays for individual audio transducers may generally be on the order of milliseconds. Further, a controller or control system may select time delays to be applied to individual audio transducers of the audio transducer array based on the determined position of the head of the user within the image data.

The process 1100 may proceed to operate individual audio transducers of the audio transducer array based on the selected time delays, as at 1110. For example, for an audio transducer array comprising individual microphones, the individual microphones may be operated based on the selected time delays, such that audio signals may be detected primarily from the determined position of the head of the user. In addition, for an audio transducer array comprising individual speakers, the individual speakers may be operated based on the selected time delays, such that audio signals may be emitted primarily toward the determined position of the head of the user. Further, a controller or control system may operate individual audio transducers of the audio transducer array based on the selected time delays to detect or emit audio signals associated with the determined position of the head of the user within the image data.

In this manner, audio signals associated with an identified head of a user within an environment, e.g., speech from the user, may be more clearly and accurately detected by an audio transducer array, e.g., microphones, and/or such audio signals may also be more accurately reproduced and output to another user by another audio transducer array, e.g., speakers, within another environment, thereby facilitating focus and engagement between the users by simulating mutual presence and direct communication within a same physical space.

The process 1100 may then end, as at 1112.

Figure 12:
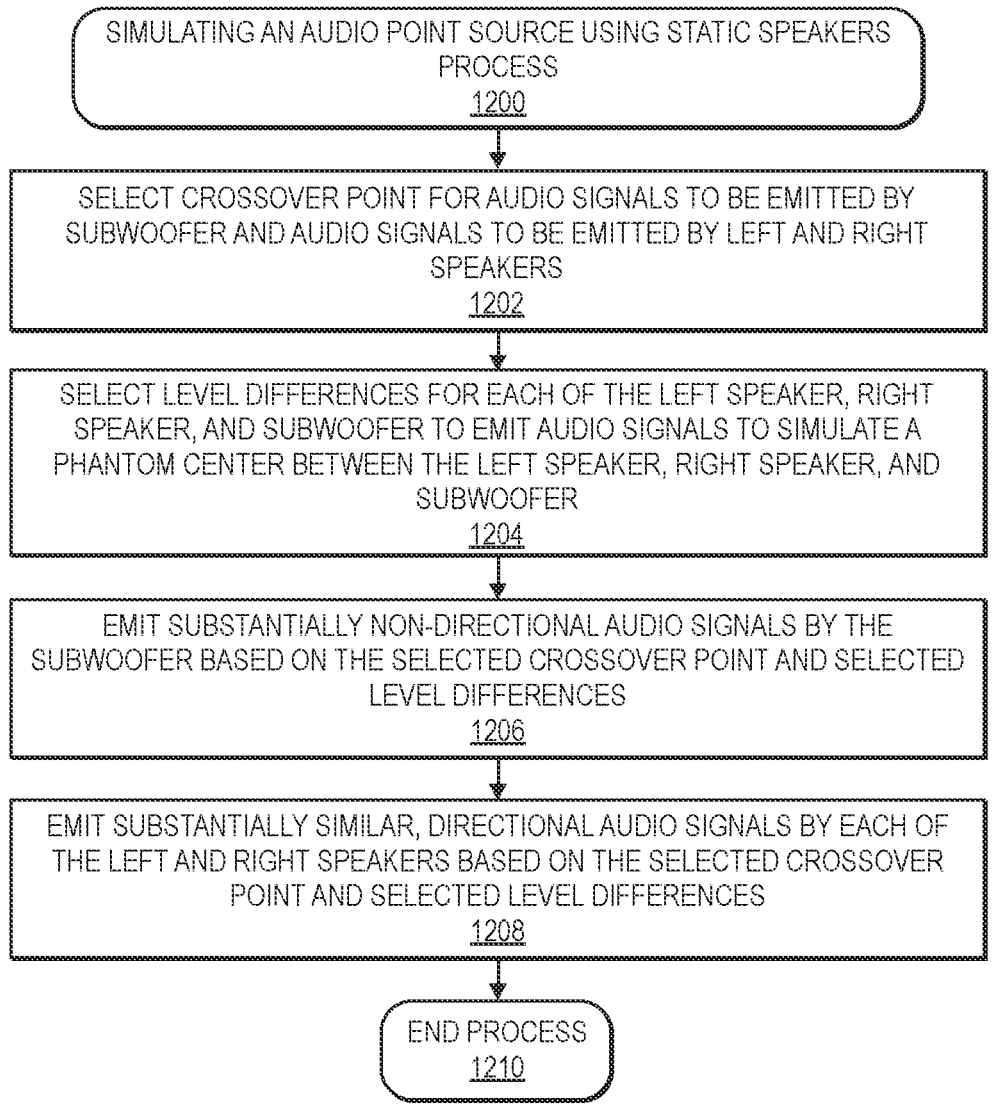
FIG. 12 is a flow diagram illustrating an example simulating an audio point source using static speakers process, in accordance with implementations of the present disclosure.

FIG. 12 is a flow diagram illustrating an example simulating an audio point source using static speakers process 1200, in accordance with implementations of the present disclosure.

The process 1200 may begin by selecting a crossover point for audio signals to be emitted by a subwoofer and audio signals to be emitted by left and right speakers, as at 1202. For example, as described herein, the left and right speakers and the lower speaker or subwoofer may be positioned in a particular arrangement relative to a presentation device, and relative to image data of a user presented via the presentation device. The crossover point may be selected such that a first range of audio frequencies is to be emitted by the left and right speakers, and a second, different range of audio frequencies is to be emitted by the lower speaker. Generally, the left and right speakers may be configured to emit substantially directional audio frequencies, which may include relatively higher audio frequencies, and the lower speaker may be configured to emit substantially non-directional audio frequencies, which may include relatively lower audio frequencies. Further, a controller or control system may select the crossover point such that substantially directional audio frequencies are emitted by the left and right speakers and substantially non-directional audio frequencies are emitted by the lower speaker.

The process 1200 may continue by selecting level differences for each of the left speaker, right speaker, and subwoofer to emit audio signals to simulate a phantom center between the left speaker, the right speaker, and the subwoofer, as at 1204. For example, in order to simulate an audio point source at a mouth of user presented via a presentation device, level differences for the left and right speakers may be selected such that the emitted, substantially directional audio signals combine to generate a phantom center, such that a user perceives that the audio signals are emanating from an audio point source associated with the mouth of the user presented via the presentation device. Similarly, in order to simulate an audio point source at a mouth of user presented via a presentation device, level differences and/or time delays between the left and right speakers and the lower speaker or subwoofer may be selected such that the emitted, substantially non-directional audio signals from the lower speaker may also combine to generate a phantom center, such that a user perceives that the audio signals are emanating from an audio point source associated with the mouth of the user presented via the presentation device. Further, a controller or control system may select level differences to be applied to individual speakers based on a desired position of a simulated audio point source, which may be further based on a position of the mouth of the user presented via the presentation device.

The process 1200 may then proceed by emitting substantially non-directional audio signals by the subwoofer based on the selected crossover point and the selected level differences, as at 1206. For example, the lower speaker may emit audio signals having a relatively lower range of audio frequencies based on the selected crossover point, and with the selected level differences to simulate an audio point source at a desired position. Further, a controller or control system may cause operation of the lower speaker based on the crossover point and the selected level differences to simulate an audio point source at a position of the mouth of the user presented via the presentation device.

The process 1200 may then continue with emitting substantially similar, directional audio signals by each of the left and right speakers based on the selected crossover point and the selected level differences, as at 1208. For example, the left and right speakers may emit substantially similar audio signals having a relatively higher range of audio frequencies based on the selected crossover point, and with the selected level differences to simulate an audio point source at a desired position. Further, a controller or control system may cause operation of the left and right speakers based on the crossover point and the selected level differences to simulate an audio point source at a position of the mouth of the user presented via the presentation device.

In this manner, audio signals received from a user within a remote environment, e.g., speech from the user, may be emitted by a combination of speakers to a user within a local environment, such that the user within the local environment perceives that the audio signals are emanating from the mouth of the user within the remote environment as presented via the presentation device, thereby facilitating focus and engagement between the users by simulating mutual presence and direct communication within a same physical space.

The process 1200 may then end, as at 1210.

Figure 13:
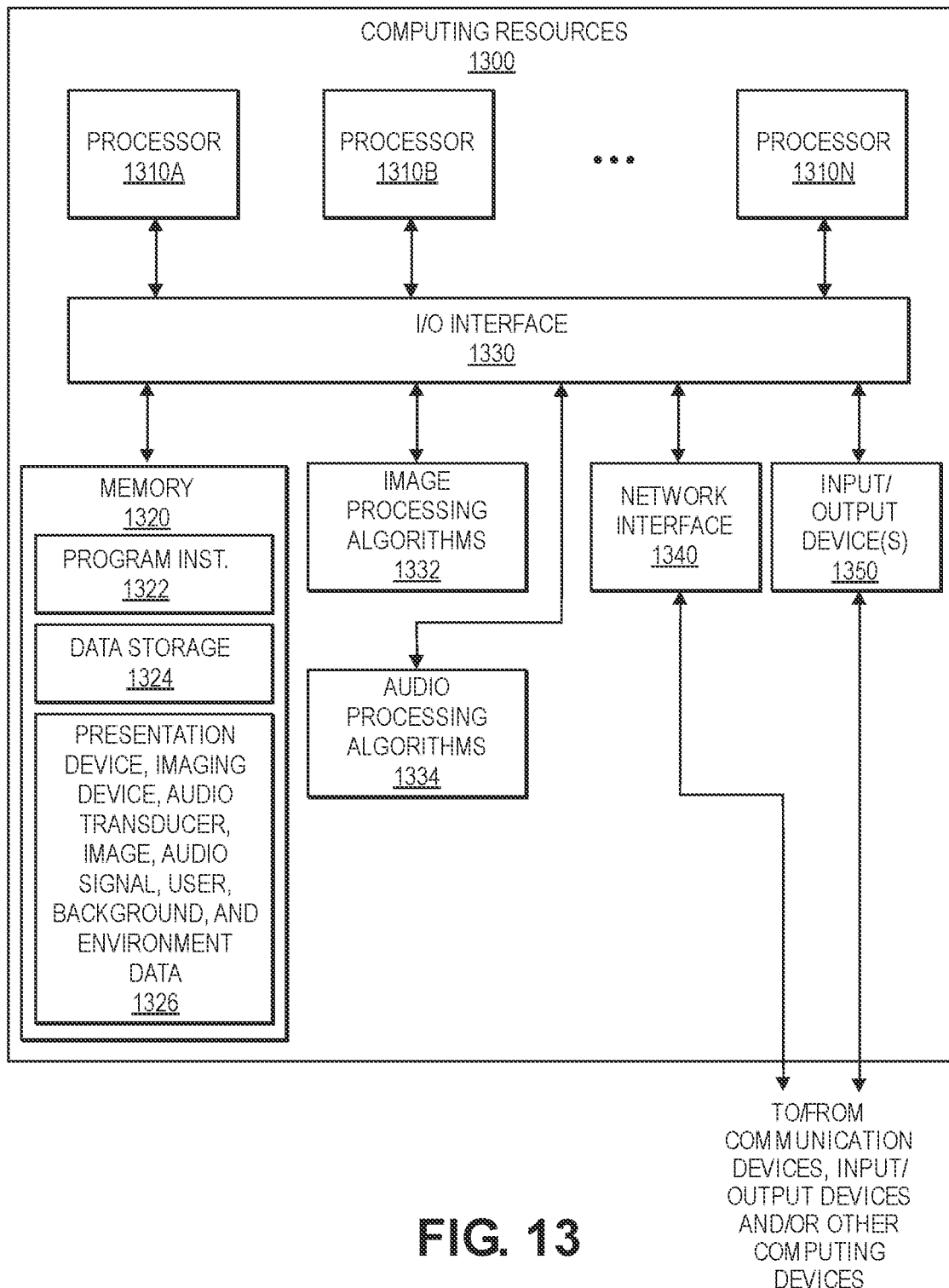
FIG. 13 is a block diagram illustrating computing resources of an example controller or control system, in accordance with implementations of the present disclosure.

FIG. 13 is a block diagram illustrating computing resources 1300 of an example controller or control system, in accordance with implementations of the present disclosure.

Various operations of a control system or controller, such as those described herein, may be executed on one or more computer systems, and/or interacting with various other computers, systems, or devices in various environments, according to various implementations. For example, the control system or controller discussed above may function and operate on one or more computer systems or resources. One such control system or computing resources is illustrated by the block diagram in FIG. 13. In the illustrated implementation, a control system 1300 includes one or more processors 1310A, 1310B through 1310N, coupled to a non-transitory computer-readable storage medium 1320 via an input/output (I/O) interface 1330. The control system 1300 further includes a network interface 1340 coupled to the I/O interface 1330, and one or more input/output devices 1350. In some implementations, it is contemplated that a described implementation may be implemented using a single instance of the control system 1300 while, in other implementations, multiple such systems or multiple nodes making up the control system 1300 may be configured to host different portions or instances of the described implementations. For example, in one implementation, some data sources or services (e.g., related to portions of example video conference systems, operations, or processes, etc.) may be implemented via one or more nodes of the control system 1300 that are distinct from those nodes implementing other data sources or services (e.g., related to other portions of example video conference systems, operations, or processes, etc.).

In various implementations, the control system 1300 may be a uniprocessor system including one processor 1310A, or a multiprocessor system including several processors 1310A-1310N (e.g., two, four, eight, or another suitable number). The processors 1310A-1310N may be any suitable processor capable of executing instructions. For example, in various implementations, the processors 1310A-1310N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1310A-1310N may commonly, but not necessarily, implement the same ISA.

The non-transitory computer-readable storage medium 1320 may be configured to store executable instructions and/or data accessible by the one or more processors 1310A-1310N. In various implementations, the non-transitory computer-readable storage medium 1320 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1320 as program instructions 1322, data storage 1324, and presentation device, imaging device, audio transducer, image, audio signal, user, background, environment, and other data 1326, respectively. In other implementations, program instructions and/or data may be received, sent or stored upon different types of computer-accessible media, such as non-transitory media, or on similar media separate from the non-transitory computer-readable storage medium 1320 or the control system 1300. Generally speaking, a non-transitory, computer-readable storage medium may include storage media or memory media such as magnetic or optical media, e.g., disk or CD/DVD-ROM, coupled to the control system 1300 via the I/O interface 1330. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1340.

In one implementation, the I/O interface 1330 may be configured to coordinate I/O traffic between the processors 1310A-1310N, the non-transitory computer-readable storage medium 1320, and any peripheral devices, including the network interface 1340 or other peripheral interfaces, such as input/output devices 1350. In some implementations, the I/O interface 1330 may perform any necessary protocol, timing or other data transformations to convert data signals from one component (e.g., non-transitory computer-readable storage medium 1320) into a format suitable for use by another component (e.g., processors 1310A-1310N). In some implementations, the I/O interface 1330 may include support for devices attached through various types of peripheral buses, such as a variant of the Peripheral Component Interconnect (PCI) bus standard or the Universal Serial Bus (USB) standard, for example. In some implementations, the function of the I/O interface 1330 may be split into two or more separate components, such as a north bridge and a south bridge, for example. Also, in some implementations, some or all of the functionality of the I/O interface 1330, such as an interface to the non-transitory computer-readable storage medium 1320, may be incorporated directly into the processors 1310A-1310N.

The network interface 1340 may be configured to allow data to be exchanged between the control system 1300 and other devices attached to a network, such as other control systems or controllers, other storage media, imaging devices, audio transducers, other sensors, other computer systems, or between nodes of the control system 1300. In various implementations, the network interface 1340 may support communication via wired or wireless general data networks, such as any suitable type of Ethernet network.

Input/output devices 1350 may, in some implementations, include one or more displays, presentation devices, projection devices, audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 1300. Multiple input/output devices 1350 may be present in the control system 1300 or may be distributed on various nodes of the control system 1300. In some implementations, similar input/output devices may be separate from the control system 1300 and may interact with one or more nodes of the control system 1300 through a wired or wireless connection, such as over the network interface 1340.

As shown in FIG. 13, the memory 1320 may include program instructions 1322 that may be configured to implement one or more of the described implementations and/or provide data storage 1324 and other data 1326, which may comprise various tables, data stores and/or other data structures accessible by the program instructions 1322. The program instructions 1322 may include various executable instructions, programs, or applications to facilitate various aspects of the example video conference systems, operations, and processes described herein, such as presentation device controllers, drivers, or applications, imaging device controllers, drivers, or applications, audio transducer controllers, drivers, or applications, image processing applications, algorithms, or techniques, audio processing applications, algorithms, or techniques, etc. The data storage 1324 and other data 1326 may include various data stores for maintaining data related to systems, operations, or processes described herein, such as presentation device, imaging device, audio transducer, image, audio signal, user, background, and environment data, etc.

Those skilled in the art will appreciate that the control system 1300 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 1300 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 3, 5, 7, 8, 11, and 12, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Implementations disclosed herein may comprise a video conference system to facilitate communications between a local environment and a remote environment, comprising: a first presentation device and a first, wide angle, high resolution imaging device associated with the local environment; a second presentation device and a second, wide angle, high resolution imaging device associated with the remote environment; and a controller configured to at least: receive, from the first imaging device associated with the local environment, image data of the local environment of the video conference system; process the image data of the local environment to identify a first user within the local environment; perform segmentation of the image data associated with the first user to identify body parts associated with the first user; receive, from the second imaging device associated with the remote environment, image data of the remote environment of the video conference system; process the image data of the remote environment to identify a second user within the remote environment; perform segmentation of the image data associated with the second user to identify body parts associated with the second user; determine associations between respective regions of the second presentation device and respective body parts associated with the first user based at least in part on positions of respective body parts associated with the second user relative to the second presentation device; modify the image data associated with the first user to align the respective body parts associated with the first user with the respective regions of the second presentation device; present, via the second presentation device to the second user within the remote environment, the modified image data associated with the first user; determine associations between respective regions of the first presentation device and respective body parts associated with the second user based at least in part on positions of respective body parts associated with the first user relative to the first presentation device; modify the image data associated with the second user to align the respective body parts associated with the second user with the respective regions of the first presentation device; and present, via the first presentation device to the first user within the local environment, the modified image data associated with the second user.

Optionally, the video conference system may further comprise a left side imaging device associated with a left side of the first presentation device within the local environment; and a right side imaging device associated with a right side of the first presentation device within the local environment; wherein the left side imaging device and the right side imaging device are aligned with each other along a substantially horizontal line; and wherein the controller is further configured to at least: align eyes associated with the second user along the substantially horizontal line between the left side imaging device and the right side imaging device.

Optionally, the video conference system may further comprise a left side imaging device associated with a left side of the second presentation device within the remote environment; and a right side imaging device associated with a right side of the second presentation device within the remote environment; wherein the left side imaging device and the right side imaging device are aligned with each other along a substantially horizontal line; and wherein the controller is further configured to at least: align eyes associated with the first user along the substantially horizontal line between the left side imaging device and the right side imaging device.

Optionally, the video conference system may further comprise a left side audio output device associated with a left side of the first presentation device within the local environment; and a right side audio output device associated with a right side of the first presentation device within the local environment; wherein the left side audio output device and the right side audio output device are aligned with each other along a substantially horizontal line; and wherein the controller is further configured to at least: align a mouth associated with the second user along the substantially horizontal line between the left side audio output device and the right side audio output device.

Optionally, the video conference system may further comprise a left side audio output device associated with a left side of the second presentation device within the remote environment; and a right side audio output device associated with a right side of the second presentation device within the remote environment; wherein the left side audio output device and the right side audio output device are aligned with each other along a substantially horizontal line; and wherein the controller is further configured to at least: align a mouth associated with the first user along the substantially horizontal line between the left side audio output device and the right side audio output device.

Implementations disclosed herein may comprise a computer-implemented method to operate a video conference system, comprising: receiving, by a controller from an imaging device within a remote environment, image data of a second user within the remote environment of the video conference system; performing, by the controller, segmentation of the image data of the second user to identify body parts associated with the second user; receiving, by the controller from an imaging device within a local environment, image data of a first user within the local environment of the video conference system; performing, by the controller, segmentation of the image data of the first user to identify positions of body parts associated with the first user relative to a first presentation device; determining, by the controller, associations between respective regions of the first presentation device within the local environment and respective body parts associated with the second user based at least in part on respective positions of body parts associated with the first user relative to the first presentation device; modifying, by the controller, the image data of the second user to align the respective body parts associated with the second user with the respective regions of the first presentation device; and presenting, by the controller, via the first presentation device to the first user within the local environment, the modified image data of the second user.

Optionally, modifying the image data of the second user may further comprise aligning eyes of the second user with a substantially horizontal line that extends between imaging devices positioned on opposite sides of the first presentation device.

Optionally, modifying the image data of the second user may further comprise aligning a mouth of the second user with a substantially horizontal line that extends between audio output devices positioned on opposite sides of the first presentation device.

Optionally, modifying the image data of the second user may further comprise aligning a waist of the second user with a substantially horizontal plane associated with a position of a waist of the first user within the local environment.

Optionally, modifying the image data of the second user may further comprise at least one of cropping, zooming, translating, or rotating the image data of the second user.

Optionally, the image data of the second user may be cropped to remove at least a portion of a background within the remote environment.

Optionally, the image data of the second user may be zoomed to be between approximately 75% and approximately 100% of actual size of the second user.

Optionally, the image data of the second user may be translated to be substantially centered within the first presentation device.

Optionally, the image data of the second user may be rotated to be facing substantially perpendicularly outward from the first presentation device.

Optionally, performing segmentation of the image data of the second user to identify body parts associated with the second user may further comprise identifying at least one of a head, neck, shoulders, torso, arms, waist, legs, eyes, nose, mouth, or ears associated with the second user.

Implementations disclosed herein may comprise a video conference system to facilitate communications between a local environment and a remote environment, comprising: a first presentation device and a first, wide angle, high resolution imaging device associated with the local environment; a second, wide angle, high resolution imaging device associated with the remote environment; and a controller configured to at least: receive, from the second imaging device associated with the remote environment, image data of a second user within the remote environment of the video conference system; perform segmentation of the image data associated with the second user to identify body parts associated with the second user; receive, from the first imaging device within the local environment, image data of a first user within the local environment of the video conference system; perform segmentation of the image data of the first user to identify positions of body parts associated with the first user relative to the first presentation device; determine associations between respective regions of the first presentation device and respective body parts associated with the second user based at least in part on respective positions of body parts associated with the first user relative to the first presentation device; modify the image data associated with the second user to align the respective body parts associated with the second user with the respective regions of the first presentation device; and present, via the first presentation device to the first user within the local environment, the modified image data associated with the second user.

Optionally, the video conference system may further comprise a left side imaging device associated with a left side of the first presentation device within the local environment; and a right side imaging device associated with a right side of the first presentation device within the local environment; wherein the left side imaging device and the right side imaging device are aligned with each other along a substantially horizontal line; and wherein the controller is further configured to at least: align eyes associated with the second user along the substantially horizontal line between the left side imaging device and the right side imaging device.

Optionally, the video conference system may further comprise a left side audio output device associated with a left side of the first presentation device within the local environment; and a right side audio output device associated with a right side of the first presentation device within the local environment; wherein the left side audio output device and the right side audio output device are aligned with each other along a substantially horizontal line; and wherein the controller is further configured to at least: align a mouth associated with the second user along the substantially horizontal line between the left side audio output device and the right side audio output device.

Optionally, the controller may be further configured to at least: align a waist associated with the second user along a substantially horizontal plane associated with a position of a waist associated with the first user within the local environment.

Optionally, the video conference system may further comprise a second presentation device associated with the remote environment; wherein the controller is further configured to at least: perform segmentation of the image data associated with the first user to identify body parts associated with the first user; determine respective regions of the second presentation device associated with respective body parts associated with the first user; modify the image data associated with the first user to align the respective body parts associated with the first user with respective regions of the second presentation device; and present, via the second presentation device to the second user within the remote environment, the modified image data associated with the first user.

Implementations disclosed herein may comprise a video conference system to facilitate communications between a local environment and a remote environment, comprising: a first presentation device, a first, wide angle, high resolution imaging device, a first left side imaging device, and a first right side imaging device associated with the local environment, the first left side imaging device and the first right side imaging device being aligned along a substantially horizontal line; a second presentation device, a second, wide angle, high resolution imaging device, a second left side imaging device, and a second right side imaging device associated with the remote environment, the second left side imaging device and the second right side imaging device being aligned along a substantially horizontal line; and a controller configured to at least: receive, from the first high resolution imaging device associated with the local environment, image data of the local environment of the video conference system; receive, from the first left side imaging device associated with the local environment, left side image data of the local environment of the video conference system; receive, from the first right side imaging device associated with the local environment, right side image data of the local environment of the video conference system; process the left side image data of the local environment to identify first left side pixels associated with a first user within the local environment; process the right side image data of the local environment to identify first right side pixels associated with the first user within the local environment; determine first matching pixels between the first left side pixels and the first right side pixels associated with the first user within the local environment; determine disparities between the first matching pixels from the first left side pixels and the first right side pixels associated with the first user; determine distances of the first matching pixels from each of the first left side imaging device and the first right side imaging device based at least in part on the determined disparities; determine three-dimensional locations of the first matching pixels relative to the first left side imaging device and the first right side imaging device based at least in part on the determined distances; shift the first matching pixels to respective locations associated with a first virtual imaging device positioned between the first left side imaging device and the first right side imaging device based at least in part on the determined three-dimensional locations of the first matching pixels; present, via the second presentation device to a second user within the remote environment, the first matching pixels shifted to respective locations associated with the first virtual imaging device in combination with at least a portion of the image data from the first high resolution imaging device; receive, from the second high resolution imaging device associated with the remote environment, image data of the remote environment of the video conference system; receive, from the second left side imaging device associated with the remote environment, left side image data of the remote environment of the video conference system; receive, from the second right side imaging device associated with the remote environment, right side image data of the remote environment of the video conference system; process the left side image data of the remote environment to identify second left side pixels associated with the second user within the remote environment; process the right side image data of the remote environment to identify second right side pixels associated with the second user within the remote environment; determine second matching pixels between the second left side pixels and the second right side pixels associated with the second user within the remote environment; determine disparities between the second matching pixels from the second left side pixels and the second right side pixels associated with the second user; determine distances of the second matching pixels from each of the second left side imaging device and the second right side imaging device based at least in part on the determined disparities; determine three-dimensional locations of the second matching pixels relative to the second left side imaging device and the second right side imaging device based at least in part on the determined distances; shift the second matching pixels to respective locations associated with a second virtual imaging device positioned between the second left side imaging device and the second right side imaging device based at least in part on the determined three-dimensional locations of the second matching pixels; and present, via the first presentation device to the first user within the local environment, the second matching pixels shifted to respective locations associated with the second virtual imaging device in combination with at least a portion of the image data from the second high resolution imaging device.

Optionally, the controller may be further configured to at least: determine distances of the first matching pixels from each of the first left side imaging device and the first right side imaging device further based at least in part on a first distance between the first left side imaging device and the first right side imaging device; and determine distances of the second matching pixels from each of the second left side imaging device and the second right side imaging device further based at least in part on a second distance between the second left side imaging device and the second right side imaging device.

Optionally, the controller may be further configured to at least: direct a gaze of the first user within the local environment to the substantially horizontal line between the first left side imaging device and the first right side imaging device; and direct a gaze of the second user within the remote environment to the substantially horizontal line between the second left side imaging device and the second right side imaging device.

Optionally, the gaze of the first user within the local environment may be further directed toward a center of the substantially horizontal line between the first left side imaging device and the first right side imaging device; and the gaze of the second user within the remote environment may be further directed toward a center of the substantially horizontal line between the second left side imaging device and the second right side imaging device.

Optionally, the first virtual imaging device may be positioned substantially at the center of the substantially horizontal line between the first left side imaging device and the first right side imaging device; and the second virtual imaging device may be positioned substantially at the center of the substantially horizontal line between the second left side imaging device and the second right side imaging device.

Implementations disclosed herein may comprise a computer-implemented method to operate a video conference system, comprising: receiving, by a controller from a high resolution imaging device within a remote environment, image data of a second user within the remote environment of the video conference system; receiving, by the controller from a left side imaging device within the remote environment, left side image data of the second user within the remote environment; receiving, by the controller from a right side imaging device within the remote environment, right side image data of the second user within the remote environment; processing, by the controller, the left side image data to identify left side pixels associated with the second user; processing, by the controller, the right side image data to identify right side pixels associated with the second user; determining, by the controller, disparities between matching pixels from the left side pixels and the right side pixels associated with the second user; determining, by the controller, three-dimensional locations of the matching pixels relative to the left side imaging device and the right side imaging device based at least in part on the determined disparities; shifting, by the controller, the matching pixels to respective locations associated with a virtual imaging device positioned between the left side imaging device and the right side imaging device based at least in part on the determined three-dimensional locations of the matching pixels; and presenting, by the controller via a first presentation device to a first user within a local environment, the matching pixels shifted to respective locations associated with the virtual imaging device in combination with at least a portion of the image data from the high resolution imaging device.

Optionally, the computer-implemented method may further comprise determining, by the controller, the matching pixels between the left side pixels and the right side pixels associated with the second user within the remote environment.

Optionally, the computer-implemented method may further comprise determining, by the controller, distances of the matching pixels from each of the left side imaging device and the right side imaging device based at least in part on the determined disparities and a distance between the left side imaging device and the right side imaging device.

Optionally, the three-dimensional locations of the matching pixels relative to the left side imaging device and the right side imaging device may be further determined based at least in part on the determined distances of the matching pixels from each of the left side imaging device and the right side imaging device.

Optionally, the computer-implemented method may further comprise directing a gaze of the second user within the remote environment to a substantially horizontal line extending between the left side imaging device and the right side imaging device.

Optionally, the gaze of the second user within the remote environment may be further directed toward a center of the substantially horizontal line extending between the left side imaging device and the right side imaging device.

Optionally, the virtual imaging device may be positioned substantially at the center of the substantially horizontal line extending between the left side imaging device and the right side imaging device.

Optionally, the gaze of the second user may be directed to the substantially horizontal line by presenting, via a second presentation device positioned between the left side imaging device and the right side imaging device, and to the second user within the remote environment, image data of the first user within the local environment.

Optionally, eyes of the first user within the local environment may be presented, via the second presentation device, along the substantially horizontal line between the left side imaging device and the right side imaging device.

Optionally, the matching pixels may be shifted along lines substantially parallel to the substantially horizontal line extending between the left side imaging device and the right side imaging device to respective locations associated with the virtual imaging device.

Implementations disclosed herein may comprise a video conference system to facilitate communications between a local environment and a remote environment, comprising: a first presentation device associated with the local environment; a second, wide angle, high resolution imaging device, a second left side imaging device, and a second right side imaging device associated with the remote environment; and a controller configured to at least: receive, from the second high resolution imaging device associated with the remote environment, image data of a second user within the remote environment of the video conference system; receive, from the second left side imaging device associated with the remote environment, left side image data of the second user within the remote environment; receive, from the second right side imaging device associated with the remote environment, right side image data of the second user within the remote environment; process the left side image data to identify left side pixels associated with the second user within the remote environment; process the right side image data to identify right side pixels associated with the second user within the remote environment; determine disparities between matching pixels from the left side pixels and the right side pixels associated with the second user; determine three-dimensional locations of the matching pixels relative to the second left side imaging device and the second right side imaging device based at least in part on the determined disparities; shift the matching pixels to respective locations associated with a virtual imaging device positioned between the second left side imaging device and the second right side imaging device based at least in part on the determined three-dimensional locations of the matching pixels; and present, via the first presentation device to a first user within the local environment, the matching pixels shifted to respective locations associated with the virtual imaging device in combination with at least a portion of the image data from the second high resolution imaging device.

Optionally, the controller may be further configured to at least: determine the matching pixels between the left side pixels and the right side pixels associated with the second user within the remote environment.

Optionally, the controller may be further configured to at least: determine distances of the matching pixels from each of the second left side imaging device and the second right side imaging device based at least in part on the determined disparities and a distance between the second left side imaging device and the second right side imaging device.

Optionally, the controller may be further configured to at least: direct a gaze of the second user within the remote environment to a center of a substantially horizontal line extending between the second left side imaging device and the second right side imaging device by presenting, via a second presentation device positioned between the second left side imaging device and the second right side imaging device, and to the second user within the remote environment, image data of eyes of the first user within the local environment along the substantially horizontal line between the second left side imaging device and the second right side imaging device.

Optionally, the video conference system may further comprise a first, wide angle, high resolution imaging device, a first left side imaging device, and a first right side imaging device associated with the local environment; and a second presentation device associated with the remote environment; wherein the controller is further configured to at least: receive, from the first high resolution imaging device associated with the local environment, image data of the first user within the local environment of the video conference system; receive, from the first left side imaging device associated with the local environment, left side image data of the first user within the local environment; receive, from the first right side imaging device associated with the local environment, right side image data of the first user within the local environment; process the left side image data to identify left side pixels associated with the first user within the local environment; process the right side image data to identify right side pixels associated with the first user within the local environment; determine disparities between matching pixels from the left side pixels and the right side pixels associated with the first user; determine three-dimensional locations of the matching pixels relative to the first left side imaging device and the first right side imaging device based at least in part on the determined disparities; shift the matching pixels to respective locations associated with a virtual imaging device positioned between the first left side imaging device and the first right side imaging device based at least in part on the determined three-dimensional locations of the matching pixels; and present, via the second presentation device to the second user within the remote environment, the matching pixels shifted to respective locations associated with the virtual imaging device in combination with at least a portion of the image data from the first high resolution imaging device.

Implementations disclosed herein may comprise a video conference system to facilitate communications between a local environment and a remote environment, comprising: a first presentation device, a first, wide angle, high resolution imaging device, and a first rearward facing imaging device associated with the local environment; a second presentation device, a second, wide angle, high resolution imaging device, and a second rearward facing imaging device associated with the remote environment; and a controller configured to at least: receive, from the second high resolution imaging device associated with the remote environment, image data of a second user within the remote environment of the video conference system; identify the second user within the image data; identify a second background associated with the second user within the image data; receive, from the first rearward facing imaging device associated with the local environment, image data of the local environment behind the first presentation device; determine at least one visual characteristic associated with the image data of the local environment from the first rearward facing imaging device; modify the second background associated with the second user based at least in part on the determined at least one visual characteristic associated with the image data of the local environment; present, via the first presentation device to a first user within the local environment, the image data of the second user having the modified second background; receive, from the first high resolution imaging device associated with the local environment, image data of the first user within the local environment of the video conference system; identify the first user within the image data; identify a first background associated with the first user within the image data; receive, from the second rearward facing imaging device associated with the remote environment, image data of the remote environment behind the second presentation device; determine at least one visual characteristic associated with the image data of the remote environment from the second rearward facing imaging device; modify the first background associated with the first user based at least in part on the determined at least one visual characteristic associated with the image data of the remote environment; and present, via the second presentation device to the second user within the remote environment, the image data of the first user having the modified first background.

Optionally, the first presentation device may not include a bezel around a periphery of the first presentation device; and the second presentation device may not include a bezel around a periphery of the second presentation device.

Optionally, modifying the second background associated with the second user may further comprise modifying at least one of color, saturation, contrast, tone, brightness, or lighting of the second background based at least in part on the determined at least one visual characteristic associated with the image data of the local environment; and modifying the first background associated with the first user may further comprise modifying at least one of color, saturation, contrast, tone, brightness, or lighting of the first background based at least in part on the determined at least one visual characteristic associated with the image data of the remote environment.

Optionally, modifying the second background associated with the second user may further comprise gradual blending of the determined at least one visual characteristic associated with the image data of the local environment with increasing distance from the second user within the image data; and modifying the first background associated with the first user may further comprise gradual blending of the determined at least one visual characteristic associated with the image data of the remote environment with increasing distance from the first user within the image data.

Optionally, the image data from the first rearward facing imaging device of the local environment behind the first presentation device may further comprise image data around a periphery of the first presentation device; and the image data from the second rearward facing imaging device of the remote environment behind the second presentation device may further comprise image data around a periphery of the second presentation device.

Implementations disclosed herein may comprise a computer-implemented method to operate a video conference system, comprising: receiving, by a controller from an imaging device within a remote environment, image data of a second user within the remote environment of the video conference system; identifying, by the controller, a background associated with the second user within the image data; receiving, by the controller from a rearward facing imaging device within a local environment, image data of the local environment at least one of behind or around a periphery of a first presentation device; determining, by the controller, at least one visual characteristic associated with the image data of the local environment from the rearward facing imaging device; modifying, by the controller, the background associated with the second user based at least in part on the determined at least one visual characteristic associated with the image data of the local environment; and presenting, by the controller via the first presentation device to a first user within the local environment, the image data of the second user having the modified background.

Optionally, modifying the background associated with the second user may further comprise modifying at least one of color, saturation, contrast, tone, brightness, or lighting of the background based at least in part on the determined at least one visual characteristic associated with the image data of the local environment.

Optionally, modifying the background associated with the second user may further comprise gradual blending of the determined at least one visual characteristic associated with the image data of the local environment.

Optionally, the at least one visual characteristic may be gradually blended with the background associated with the second user with increasing distance from the second user within the image data.

Optionally, the first presentation device may not include a bezel around a periphery of the first presentation device.

Optionally, modifying the background associated with the second user may further comprise blurring at least a portion of the background to maintain focus on the second user.

Optionally, the computer-implemented method may further comprise identifying, by the controller, the second user within the image data.

Optionally, the computer-implemented method may further comprise: receiving, by the controller from a forward facing imaging device within the local environment, image data of the local environment or the first user within the local environment; determining, by the controller, at least one visual characteristic associated with the image data of the local environment or the first user within the local environment from the forward facing imaging device; modifying, by the controller, a presentation of the second user based at least in part on the determined at least one visual characteristic associated with the image data of the local environment or the first user within the local environment from the forward facing imaging device; and presenting, by the controller via the first presentation device to the first user within the local environment, the image data of the second user having the modified presentation.

Optionally, modifying the presentation of the second user may further comprise modifying at least one of color, saturation, contrast, tone, brightness, or lighting associated with the presentation of the second user based at least in part on the determined at least one visual characteristic associated with the image data of the local environment or the first user within the local environment from the forward facing imaging device.

Optionally, the presentation of the second user may be modified to match the at least one visual characteristic associated with the image data of the first user within the local environment from the forward facing imaging device.

Implementations disclosed herein may comprise a video conference system to facilitate communications between a local environment and a remote environment, comprising: a first presentation device and a first rearward facing imaging device associated with the local environment; a second, wide angle, high resolution imaging device associated with the remote environment; and a controller configured to at least: receive, from the second imaging device associated with the remote environment, image data of a second user within the remote environment of the video conference system; identify a background associated with the second user within the image data; receive, from the first imaging device associated with the local environment, image data of the local environment at least one of behind or around a periphery of the first presentation device; determine at least one visual characteristic associated with the image data of the local environment from the first imaging device; modify the background associated with the second user based at least in part on the determined at least one visual characteristic associated with the image data of the local environment; and present, via the first presentation device to a first user within the local environment, the image data of the second user having the modified background.

Optionally, modifying the background associated with the second user may further comprise modifying at least one of color, saturation, contrast, tone, brightness, or lighting of the background based at least in part on the determined at least one visual characteristic associated with the image data of the local environment.

Optionally, the controller may be further configured to at least: identify the second user within the image data; receive, from a first, wide angle, high resolution imaging device associated with the local environment, image data of the local environment or the first user within the local environment; determine at least one visual characteristic associated with the image data of the local environment or the first user within the local environment from the first high resolution imaging device; modify a presentation of the second user based at least in part on the determined at least one visual characteristic associated with the image data of the local environment or the first user within the local environment from the first high resolution imaging device; and present, via the first presentation device to the first user within the local environment, the image data of the second user having the modified presentation.

Optionally, modifying the presentation of the second user may further comprise modifying at least one of color, saturation, contrast, tone, brightness, or lighting associated with the presentation of the second user based at least in part on the determined at least one visual characteristic associated with the image data of the local environment or the first user within the local environment from the first high resolution imaging device.

Optionally, the video conference system may further comprise: a second presentation device and a second rearward facing imaging device associated with the remote environment; wherein the controller is further configured to at least: receive, from the first high resolution imaging device associated with the local environment, image data of the first user within the local environment of the video conference system; identify a background associated with the first user within the image data; receive, from the second rearward facing imaging device associated with the remote environment, image data of the remote environment at least one of behind or around a periphery of the second presentation device; determine at least one visual characteristic associated with the image data of the remote environment from the second rearward facing imaging device; modify the background associated with the first user based at least in part on the determined at least one visual characteristic associated with the image data of the remote environment; and present, via the second presentation device to the second user within the remote environment, the image data of the first user having the modified background.

Implementations disclosed herein may comprise a video conference system to facilitate communications between a local environment and a remote environment, comprising: a first presentation device, a first microphone array, a first speaker, and a first, wide angle, high resolution imaging device associated with the local environment; a second presentation device, a second microphone array, a second speaker, and a second, wide angle, high resolution imaging device associated with the remote environment; and a controller configured to at least: receive, from the first high resolution imaging device associated with the local environment, image data of a first user within the local environment of the video conference system; perform segmentation of the image data of the first user to identify a head associated with the first user; determine a three-dimensional position of the head associated with the first user relative to the first high resolution imaging device; select time delays for individual microphones of the first microphone array to detect audio signals from the three-dimensional position of the head associated with the first user; receive, by the individual microphones of the first microphone array, first audio signals based on the selected time delays; output, via the second speaker associated with the remote environment, the first audio signals with a presentation, via the second presentation device to a second user within the remote environment, of the image data of the first user; receive, from the second high resolution imaging device associated with the remote environment, image data of the second user within the remote environment of the video conference system; perform segmentation of the image data of the second user to identify a head associated with the second user; determine a three-dimensional position of the head associated with the second user relative to the second high resolution imaging device; select time delays for individual microphones of the second microphone array to detect audio signals from the three-dimensional position of the head associated with the second user; receive, by the individual microphones of the second microphone array, second audio signals based on the selected time delays; and output, via the first speaker associated with the local environment, the second audio signals with a presentation, via the first presentation device to the first user within the local environment, of the image data of the second user.

Optionally, the first microphone array may be positioned along an upper periphery of the first presentation device; and the second microphone array may be positioned along an upper periphery of the second presentation device.

Optionally, the first microphone array may include a plurality of individual microphones having a logarithmic spacing; and the second microphone array may include a plurality of individual microphones having a logarithmic spacing.

Optionally, the time delays for individual microphones of the first microphone array may be selected to generate a narrow directivity pattern focused on the three-dimensional position of the head associated with the first user; and the time delays for individual microphones of the second microphone array may be selected to generate a narrow directivity pattern focused on the three-dimensional position of the head associated with the second user.

Optionally, the three-dimensional position of the head associated with the first user may include an angle and a distance relative to the first high resolution imaging device; and the three-dimensional position of the head associated with the second user may include an angle and a distance relative to the second high resolution imaging device.

Implementations disclosed herein may comprise a computer-implemented method to operate a video conference system, comprising: receiving, by a controller from an imaging device within a local environment, image data of a first user within the local environment of the video conference system; performing, by the controller, segmentation of the image data of the first user to identify a head associated with the first user; determining, by the controller, a position of the head associated with the first user relative to the imaging device; selecting, by the controller, time delays for individual audio transducers of a first audio transducer array based at least in part on the determined position of the head associated with the first user; and receiving, by the controller from the individual audio transducers of the first audio transducer array, first audio signals based on the selected time delays.

Optionally, determining the position of the head associated with the first user may comprise determining at least one of an angle or a distance relative to the imaging device.

Optionally, the angle relative to the imaging device may be determined within a horizontal plane.

Optionally, time delays for individual audio transducers of the first audio transducer array may be selected to generate a narrow directivity pattern focused on the determined position of the head associated with the first user.

Optionally, the computer-implemented method may further comprise processing, by the controller, the first audio signals to remove ambient noise.

Optionally, the computer-implemented method may further comprise outputting, by the controller via an audio output device within a remote environment, the first audio signals with a presentation, via a presentation device to a second user within the remote environment, of the image data of the first user; wherein the audio output device within the remote environment comprises a plurality of audio output devices.

Optionally, the computer-implemented method may further comprise selecting, by the controller, a crossover point between a first subset of the first audio signals to be output by a first group of the plurality of audio output devices and a second subset of the first audio signals to be output by a second group of the plurality of audio output devices.

Optionally, the first subset of the first audio signals may include substantially directional audio signals, and the second subset of the first audio signals may include substantially non-directional audio signals.

Optionally, the computer-implemented method may further comprise selecting, by the controller, level differences for individual ones of the plurality of audio output devices to simulate a phantom center among the plurality of audio output devices.

Optionally, the first audio signals may be output by the plurality of audio output devices within the remote environment based on the selected level differences.

Implementations disclosed herein may comprise a video conference system to facilitate communications between a local environment and a remote environment, comprising: a first audio transducer array and a first imaging device associated with the local environment; and a controller configured to at least: receive, from the first imaging device within the local environment, image data of a first user within the local environment of the video conference system; perform segmentation of the image data of the first user to identify a head associated with the first user; determine a position of the head associated with the first user relative to the first imaging device; select time delays for individual audio transducers of the first audio transducer array based at least in part on the determined position of the head associated with the first user; and receive, by the individual audio transducers of the first audio transducer array, first audio signals based on the selected time delays.

Optionally, the first audio transducer array may be positioned along an upper periphery of a first presentation device associated with the local environment and may include a plurality of individual audio transducers having a logarithmic spacing.

Optionally, determining the position of the head associated with the first user may comprise determining at least one of an angle or a distance relative to the first imaging device.

Optionally, the time delays for individual audio transducers of the first audio transducer array may be selected to generate a narrow directivity pattern focused on the determined position of the head associated with the first user.

Optionally, the video conference system may further comprise: a second audio transducer array and a second imaging device associated with the remote environment; wherein the controller is further configured to at least: receive, from the second imaging device within the remote environment, image data of the second user within the remote environment of the video conference system; perform segmentation of the image data of the second user to identify a head associated with the second user; determine a position of the head associated with the second user relative to the second imaging device; select time delays for individual audio transducers of the second audio transducer array based at least in part on the determined position of the head associated with the second user; and receive, by the individual audio transducers of the second audio transducer array, second audio signals based on the selected time delays.

Although the invention has been described and illustrated with respect to illustrative implementations thereof, the foregoing and various other additions and omissions may be made therein and thereto without departing from the spirit and scope of the present disclosure.

What is claimed is:

1. A video conference system to facilitate communications between a local environment and a remote environment, comprising:
   a first presentation device, a first, wide angle, high resolution imaging device, and a first rearward facing imaging device associated with the local environment;
   a second presentation device, a second, wide angle, high resolution imaging device, and a second rearward facing imaging device associated with the remote environment; and
   a controller configured to at least:
      receive, from the second high resolution imaging device associated with the remote environment, image data of a second user within the remote environment of the video conference system;
      identify the second user within the image data;
      identify a second background associated with the second user within the image data;
      receive, from the first rearward facing imaging device associated with the local environment, image data of the local environment behind the first presentation device;
      determine at least one visual characteristic associated with the image data of the local environment from the first rearward facing imaging device;
      modify the second background associated with the second user based at least in part on the determined at least one visual characteristic associated with the image data of the local environment;
      present, via the first presentation device to a first user within the local environment, the image data of the second user having the modified second background;
      receive, from the first high resolution imaging device associated with the local environment, image data of the first user within the local environment of the video conference system;
      identify the first user within the image data;
      identify a first background associated with the first user within the image data;
      receive, from the second rearward facing imaging device associated with the remote environment, image data of the remote environment behind the second presentation device;
      determine at least one visual characteristic associated with the image data of the remote environment from the second rearward facing imaging device;
      modify the first background associated with the first user based at least in part on the determined at least one visual characteristic associated with the image data of the remote environment; and
      present, via the second presentation device to the second user within the remote environment, the image data of the first user having the modified first background.

2. The video conference system of claim 1, wherein the first presentation device does not include a bezel around a periphery of the first presentation device; and
   wherein the second presentation device does not include a bezel around a periphery of the second presentation device.

3. The video conference system of claim 1, wherein modifying the second background associated with the second user further comprises modifying at least one of color, saturation, contrast, tone, brightness, or lighting of the second background based at least in part on the determined at least one visual characteristic associated with the image data of the local environment; and
   wherein modifying the first background associated with the first user further comprises modifying at least one of color, saturation, contrast, tone, brightness, or lighting of the first background based at least in part on the determined at least one visual characteristic associated with the image data of the remote environment.

4. The video conference system of claim 1, wherein modifying the second background associated with the second user further comprises gradual blending of the determined at least one visual characteristic associated with the image data of the local environment with increasing distance from the second user within the image data; and
   wherein modifying the first background associated with the first user further comprises gradual blending of the determined at least one visual characteristic associated with the image data of the remote environment with increasing distance from the first user within the image data.

5. The video conference system of claim 1, wherein the image data from the first rearward facing imaging device of the local environment behind the first presentation device further comprises image data around a periphery of the first presentation device; and
   wherein the image data from the second rearward facing imaging device of the remote environment behind the second presentation device further comprises image data around a periphery of the second presentation device.

6. A computer-implemented method to operate a video conference system, comprising:
   receiving, by a controller from an imaging device within a remote environment, image data of a second user within the remote environment of the video conference system;
   identifying, by the controller, a background associated with the second user within the image data;
   receiving, by the controller from a rearward facing imaging device within a local environment, image data of the local environment at least one of behind or around a periphery of a first presentation device;
   determining, by the controller, at least one visual characteristic associated with the image data of the local environment from the rearward facing imaging device;
   modifying, by the controller, the background associated with the second user based at least in part on the determined at least one visual characteristic associated with the image data of the local environment; and
   presenting, by the controller via the first presentation device to a first user within the local environment, the image data of the second user having the modified background.

7. The computer-implemented method of claim 6, wherein modifying the background associated with the second user further comprises modifying at least one of color, saturation, contrast, tone, brightness, or lighting of the background based at least in part on the determined at least one visual characteristic associated with the image data of the local environment.

8. The computer-implemented method of claim 6, wherein modifying the background associated with the second user further comprises gradual blending of the determined at least one visual characteristic associated with the image data of the local environment.

9. The computer-implemented method of claim 8, wherein the at least one visual characteristic is gradually blended with the background associated with the second user with increasing distance from the second user within the image data.

10. The computer-implemented method of claim 6, wherein the first presentation device does not include a bezel around a periphery of the first presentation device.

11. The computer-implemented method of claim 6, wherein modifying the background associated with the second user further comprises blurring at least a portion of the background to maintain focus on the second user.

12. The computer-implemented method of claim 6, further comprising:
  identifying, by the controller, the second user within the image data.

13. The computer-implemented method of claim 12, further comprising:
  receiving, by the controller from a forward facing imaging device within the local environment, image data of the local environment or the first user within the local environment;
  determining, by the controller, at least one visual characteristic associated with the image data of the local environment or the first user within the local environment from the forward facing imaging device;
  modifying, by the controller, a presentation of the second user based at least in part on the determined at least one visual characteristic associated with the image data of the local environment or the first user within the local environment from the forward facing imaging device; and
  presenting, by the controller via the first presentation device to the first user within the local environment, the image data of the second user having the modified presentation.

14. The computer-implemented method of claim 13, wherein modifying the presentation of the second user further comprises modifying at least one of color, saturation, contrast, tone, brightness, or lighting associated with the presentation of the second user based at least in part on the determined at least one visual characteristic associated with the image data of the local environment or the first user within the local environment from the forward facing imaging device.

15. The computer-implemented method of claim 14, wherein the presentation of the second user is modified to match the at least one visual characteristic associated with the image data of the first user within the local environment from the forward facing imaging device.

16. A video conference system to facilitate communications between a local environment and a remote environment, comprising:
  a first presentation device and a first rearward facing imaging device associated with the local environment;
  a second, wide angle, high resolution imaging device associated with the remote environment; and
  a controller configured to at least:
    receive, from the second imaging device associated with the remote environment, image data of a second user within the remote environment of the video conference system;
    identify a background associated with the second user within the image data;
    receive, from the first imaging device associated with the local environment, image data of the local environment at least one of behind or around a periphery of the first presentation device;
    determine at least one visual characteristic associated with the image data of the local environment from the first imaging device;
    modify the background associated with the second user based at least in part on the determined at least one visual characteristic associated with the image data of the local environment; and
    present, via the first presentation device to a first user within the local environment, the image data of the second user having the modified background.

17. The video conference system of claim 16, wherein modifying the background associated with the second user further comprises modifying at least one of color, saturation, contrast, tone, brightness, or lighting of the background based at least in part on the determined at least one visual characteristic associated with the image data of the local environment.

18. The video conference system of claim 16, wherein the controller is further configured to at least:
  identify the second user within the image data;
  receive, from a first, wide angle, high resolution imaging device associated with the local environment, image data of the local environment or the first user within the local environment;
  determine at least one visual characteristic associated with the image data of the local environment or the first user within the local environment from the first high resolution imaging device;
  modify a presentation of the second user based at least in part on the determined at least one visual characteristic associated with the image data of the local environment or the first user within the local environment from the first high resolution imaging device; and
  present, via the first presentation device to the first user within the local environment, the image data of the second user having the modified presentation.

19. The video conference system of claim 18, wherein modifying the presentation of the second user further comprises modifying at least one of color, saturation, contrast, tone, brightness, or lighting associated with the presentation of the second user based at least in part on the determined at least one visual characteristic associated with the image data of the local environment or the first user within the local environment from the first high resolution imaging device.

20. The video conference system of claim 18, further comprising:
  a second presentation device and a second rearward facing imaging device associated with the remote environment;
  wherein the controller is further configured to at least:
    receive, from the first high resolution imaging device associated with the local environment, image data of the first user within the local environment of the video conference system;
    identify a background associated with the first user within the image data;
    receive, from the second rearward facing imaging device associated with the remote environment, image data of the remote environment at least one of behind or around a periphery of the second presentation device;
    determine at least one visual characteristic associated with the image data of the remote environment from the second rearward facing imaging device;
    modify the background associated with the first user based at least in part on the determined at least one visual characteristic associated with the image data of the remote environment; and present, via the second presentation device to the second user within the remote environment, the image data of the first user having the modified background.

\* \* \* \* \*